(12) United States Patent
Sato

(10) Patent No.: US 7,247,193 B2
(45) Date of Patent: Jul. 24, 2007

(54) INK, INK SET, INK JET RECORDING METHOD, INK CARTRIDGE, RECORDING UNIT, AND INK JET RECORDING APPARATUS

(75) Inventor: Shin-ichi Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/342,713

(22) Filed: Jan. 31, 2006

(65) Prior Publication Data

US 2006/0124027 A1 Jun. 15, 2006

Related U.S. Application Data

(63) Continuation of application No. PCT/JP2005/014607, filed on Aug. 3, 2005.

(30) Foreign Application Priority Data

Aug. 4, 2004 (JP) ............... 2004-228231
Aug. 2, 2005 (JP) ............... 2005-224241

(51) Int. Cl.
*C09D 11/00* (2006.01)
*C09D 11/02* (2006.01)
*B41J 2/01* (2006.01)

(52) U.S. Cl. ............... 106/31.27; 106/31.57; 106/31.58; 106/31.6; 106/31.85; 106/31.86; 347/100

(58) Field of Classification Search ............ 106/31.27, 106/31.6, 31.57, 31.58, 31.85, 31.86; 347/100
See application file for complete search history.

(56) References Cited

U.S. PATENT DOCUMENTS

| 4,202,870 A | 5/1980 | Weber et al. ............... 423/630 |
| 4,242,271 A | 12/1980 | Weber et al. ............. 260/448 AD |
| 4,248,852 A | 2/1981 | Wakabayashi et al. ...... 423/626 |
| 4,723,129 A | 2/1988 | Endo et al. ................ 346/1.1 |
| 4,740,796 A | 4/1988 | Endo et al. ................ 346/1.1 |
| 5,091,009 A | 2/1992 | Nogami et al. ............ 106/287.1 |
| 5,221,497 A | 6/1993 | Watanabe et al. ......... 252/313.2 |
| 5,395,434 A | 3/1995 | Tochihara et al. ......... 106/22 R |
| 5,415,686 A | 5/1995 | Kurabayashi et al. ..... 106/26 R |
| 5,451,251 A | 9/1995 | Mafune et al. ............ 106/22 H |
| 5,482,545 A | 1/1996 | Aoki et al. ................ 106/22 K |
| 5,485,188 A | 1/1996 | Tochihara et al. .......... 347/100 |

(Continued)

FOREIGN PATENT DOCUMENTS

JP 57-44605 B2 9/1982

(Continued)

*Primary Examiner*—Helene Klemanski
(74) *Attorney, Agent, or Firm*—Fitzpatrick, Cella, Harper & Scinto

(57) ABSTRACT

A second ink to be used in combination with a first ink for use in an ink jet recording apparatus having a first opening to which the first ink is supplied, a second opening to which the second ink is supplied, and a cover member with which the first opening and the second opening are covered to form a closed space, the first ink having a molar fraction of water of N (%) to a water soluble compound having a molecular weight of 300 or less, in which the second ink has a molar fraction of water that is different from N (%) and is N−5 (%) or more and N+5 (%) or less.

25 Claims, 9 Drawing Sheets

U.S. PATENT DOCUMENTS

| | | | |
|---|---|---|---|
| 5,769,930 A * | 6/1998 | Sano et al. | 106/31.36 |
| 5,835,116 A | 11/1998 | Sato et al. | 347/98 |
| 5,933,164 A | 8/1999 | Sato et al. | 347/43 |
| 6,003,987 A | 12/1999 | Yamamoto et al. | 347/100 |
| 6,027,210 A | 2/2000 | Kurabayashi et al. | 347/100 |
| 6,186,615 B1 | 2/2001 | Sato et al. | 347/43 |
| 6,238,045 B1 | 5/2001 | Ono et al. | 347/96 |
| 6,322,209 B1 | 11/2001 | Sato et al. | 347/105 |
| 6,511,534 B1 | 1/2003 | Mishina et al. | 106/31.33 |
| 6,698,876 B2 | 3/2004 | Sato et al. | 347/100 |
| 6,852,154 B2 | 2/2005 | Kitamura et al. | 106/31.47 |
| 6,976,755 B2 | 12/2005 | Sato et al. | 347/100 |
| 2002/0111395 A1 | 8/2002 | Horikoshi et al. | 523/160 |
| 2004/0048745 A1 | 3/2004 | Kitamura et al. | 503/201 |
| 2004/0069183 A1 | 4/2004 | Kamoto et al. | 106/31.27 |
| 2004/0080594 A1 | 4/2004 | Ohira et al. | 347/100 |
| 2005/0005818 A1 | 1/2005 | Sato et al. | 106/31.27 |
| 2005/0131104 A1 | 6/2005 | Aikawa et al. | 523/160 |
| 2006/0102046 A1* | 5/2006 | Okamura et al. | 106/31.47 |
| 2006/0102047 A1 | 5/2006 | Yoshizawa et al. | 106/31.47 |
| 2006/0102048 A1* | 5/2006 | Nakamura et al. | 106/31.52 |
| 2006/0103705 A1 | 5/2006 | Yoshizawa et al. | 346/100 |
| 2006/0103706 A1 | 5/2006 | Aikawa et al. | 347/100 |
| 2006/0109324 A1* | 5/2006 | Fujimoto et al. | 106/31.58 |
| 2006/0119682 A1* | 6/2006 | Okamura et al. | 106/31.47 |
| 2006/0119683 A1* | 6/2006 | Yashizawa et al. | 347/100 |
| 2006/0119685 A1* | 6/2006 | Yamashita et al. | 106/31.5 |
| 2006/0146108 A1* | 7/2006 | Sato et al. | 347/100 |
| 2006/0152569 A1 | 7/2006 | Jinnou et al. | 347/105 |
| 2006/0156952 A1* | 7/2006 | Takayama et al. | 106/31.52 |

FOREIGN PATENT DOCUMENTS

| | | |
|---|---|---|
| JP | 2803134 B2 | 9/1998 |
| JP | 2881847 B2 | 4/1999 |
| JP | 2000-212487 | 8/2000 |
| JP | 2003-182098 | 7/2003 |
| JP | 2003-206421 | 7/2003 |
| JP | 2004-2814 | 1/2004 |
| JP | 2004-83621 | 3/2004 |
| JP | 2004-143454 | 5/2004 |
| JP | 2004-168793 | 6/2004 |
| JP | 2004-175935 | 6/2004 |
| JP | 2004-209759 | 7/2004 |

* cited by examiner

INK, INK SET, INK JET RECORDING METHOD, INK CARTRIDGE, RECORDING UNIT, AND INK JET RECORDING APPARATUS

This application is a continuation of International Application No. PCT/JP2005/014607 filed on Aug. 3, 2005, which claims the benefit of Japanese Patent Application Nos. 2004-228231, filed Aug. 4, 2004 and 2005-224241, filed Aug. 2, 2005.

BACKGROUND OF THE INVENTION

1. Field of the Invention

The present invention relates to an ink excellent in recovery property of image performance when printing is started again after the ink in an ink cartridge has been mounted on an inkjet recording apparatus for a long time period, and to an ink set, an ink jet recording method, an ink cartridge, a recording unit, and an inkjet recording apparatus each using the ink.

2. Related Background Art

An ink jet recording method is a recording method of applying a small ink droplet to any one of recording media such as plain paper and glossy media to form an image, and has become rapidly wide spread owing to a reduction in its cost and an improvement in its recording rate. With the rapid spread of digital cameras in addition to an improvement in quality of an image recorded by the method, the method has been generally used as a method of outputting a photographic image comparable to silver halide photography.

In recent years, image quality has undergone an improvement never possible before owing to, for example, an extreme reduction in size of an ink droplet, an improvement of color gamut achieved by the introduction of multi-color inks, and the emergence of a coloring material capable of improving image fastness properties such as light resistance and gas resistance. Meanwhile, there have been growing loads on the molecular design of a coloring material and the design of an ink composition securing reliability requested for ink jet ink.

A large number of proposals concerning various kinds of coloring materials, inks, and ink set compositions have been made with a view to solving the above problems (see, for example, Japanese Patent Application Laid-Open No. 2004-2814).

The solubility of a coloring material needs to be optimized in seeking for such a coloring material as to enhance image performance and image fastness properties. Similarly, when one seeks for the composition of ink with which printing providing high image quality can be performed at an increased speed, the physical properties and the like of the ink needs to be optimized. Of course, coloring materials having different colors have different chemical structures, and even coloring materials having the same water-soluble group are different from each, other in solubility with respect to water or a water-soluble organic solvent. Therefore, for an ink for each color to be used for color recording, the ink composition optimized for the coloring material contained in the ink, has been developed. As a result, it can be said that the inks for respective colors are generally different from each other in ink composition.

In particular, in recent years, there has been growing performance requested for ink jet ink. Conventionally, inks containing different coloring materials but having the same composition have caused no problem. However, such inks may cause a problem when used for recent ink jet inks. Accordingly, inks for respective colors needs to be different from each other in ink composition.

In view of the above, the inventors of the present invention have mounted, on a recording head, an ink cartridge containing inks for respective colors each having a composition optimized for its coloring material so as to be applicable to an ink jet recording apparatus (such as an ink having a composition optimized for performances such as sticking recovery property from a state where the ink is left for a long time period without the use of a recording apparatus; or ejection stability of the ink in a low-temperature environment). Then, the inventors have performed printing again after an ink jet recording apparatus had been left for a relatively short time period (about 4 days). As a result, a phenomenon occurred, in which a portion printed at an early stage of printing became pale or concentrated depending on ink. As a result, in an image, a portion printed in the first half of printing (an upper portion when the image was observed from its front) caused color unevenness, so the image did not have any allowable image quality.

The inventors of the present invention have observed the image to find the following. The phenomenon occurs over the range from a fifth line (scanning 5 times) to about a tenth line (scanning 10 times) from the start of printing in an ink jet recording apparatus that performs recording by virtue of scan with a recording head, and then the phenomenon is gradually eliminated with printing. The inventors have also found that the phenomenon is particularly remarkable when in an ink for a certain color a specific water-soluble compound is added and in inks for the other colors such compound is not added because the compound is not needed for the performance of the inks for the other colors. The inventors have also found that the phenomenon is particularly remarkable in an ink jet recording apparatus having a constitution in which ejection orifices for two or more kinds of inks in a recording head are capped with one cap part.

To provide an image obtained through an ink jet recording method with image performance comparable to that of silver halide photography, it is most important to improve the color developability and image fastness properties of an ink for each color and to print an image capable of maintaining its performance regardless of a recording environment. In other words, such deterioration of the state of a printed image as described above is of great concern. Moreover, a phenomenon in which the use of inks for an ink set causes a problem in terms of performance such as image quality or reliability, even though each of the inks causes no problem in terms of performance such as image quality or reliability when the ink is singly evaluated for such performance, is a problem not conceived hitherto.

Therefore, an object of the present invention is to provide an ink excellent in recovery property of image performance when printing is started again after the ink in an ink cartridge has been mounted on an ink jet recording apparatus for a long time period.

Another object of the present invention is to provide an ink set, an ink jet recording method, an ink cartridge, a recording unit, and an ink jet recording apparatus each using the ink.

The above objects are achieved by the present invention described below.

SUMMARY OF THE INVENTION

According to one aspect of the, present invention, there is provided a second ink to be used in combination with a first ink for use in an ink jet recording apparatus having a first opening to which the first ink is supplied, a second opening to which the second ink is supplied, and a cover member with which the first opening and the second opening are covered to form a closed space, the first ink having a molar fraction of water of N (%) to a water-soluble compound having a molecular weight of 300 or less, in which the second ink has a molar fraction of water that is different from N (%) and is N−5(%) or more and N+5(%) or less.

According to another aspect of the present invention, there is provided a second ink to be used in combination with a first ink out of multiple inks for use in an ink jet recording apparatus having multiple openings to each of which each of at least three kinds of the multiple inks is supplied and a cover member with which the multiple openings are covered to form a closed space, the first ink having a maximum molar fraction N (%) of water to a water-soluble compound having a molecular weight of 300 or less, in which the second ink has a molar fraction of water that is N−5(%) or more and less than N (%)

According to another aspect of the present invention, there is provided an ink for an ink set for use in an ink jet recording apparatus having a first opening to which a first ink is supplied, a second opening to which a second ink is supplied, and a cover member with which the first opening and the second opening are covered to form a closed space, in which a difference in molar fraction (%) of water to a water-soluble compound having a molecular weight of 300 or less between any two of inks constituting the ink set is more than 0% and 5% or less.

According to another aspect of the present invention, there is provided an ink for an ink set for use in an ink jet recording apparatus having multiple openings to each of which each of at least three kinds of multiple inks is supplied and a cover member with which the multiple openings are cohered to form a closed space, in which a difference between a maximum and minimum molar fractions (%) of water to a water-soluble compound having a molecular weight of 300 or less in respective inks constituting the ink set out of the multiple inks to be supplied to the multiple openings covered with the cover member is more than 0% and 5% or less.

According to another aspect of the present invention, there is provided an ink for an ink set constituted by at least two kinds of ink one of which contains a water-soluble compound X which is not present in the other ink, in which a difference between a maximum and minimum amounts of evaporation (mass %) of water is 3% or less when all inks constituting the ink set are left in an environment having a relative humidity of 80%.

According to another aspect of the present invention, there is provided an ink set for use in an ink jet recording apparatus having a first opening to which a first ink is supplied, a second opening to which a second ink is supplied, and a cover member with which the first opening and the second opening are covered to form a closed space, the ink set comprising at least the first ink and the second ink, in which the first ink has a molar fraction of water of N (%) to a water-soluble compound having a molecular weight of 300or less; and the second ink has a molar fraction of water to the water-soluble compound having a molecular weight of 300 or less that is different from N (%) and is N−5(%) or more and N+5(%) or less.

According to another aspect of the present invention, there is provided an ink jet recording method including ejecting an ink by an ink jet method, in which the ink is the ink having the above constitution.

According to another aspect of the present invention, there is provided an ink cartridge including an ink storage portion for storing an ink, in which the ink is the ink having the above constitution.

According to another aspect of the present invention, there is provided a recording unit including an ink storage, portion for storing an ink; and a recording head for ejecting the ink, in which the ink is the ink having the above constitution.

According to another aspect of the present invention, there is provided an ink jet recording apparatus including an ink storage portion for storing an ink; and a recording head for ejecting the ink, in which the ink is the ink having the above constitution.

According to the present invention, there can be provided an ink excellent in recovery property of image performance when printing is started again after the ink in an ink cartridge has been mounted on an ink jet recording apparatus for a long time period. According to the present invention, there can be provided an ink set, an ink jet recording method, an ink-cartridge, a recording unit, and an ink jet recording apparatus each using the ink.

DESCRIPTION OF THE PREFERRED EMBODIMENTS

Figure 1:
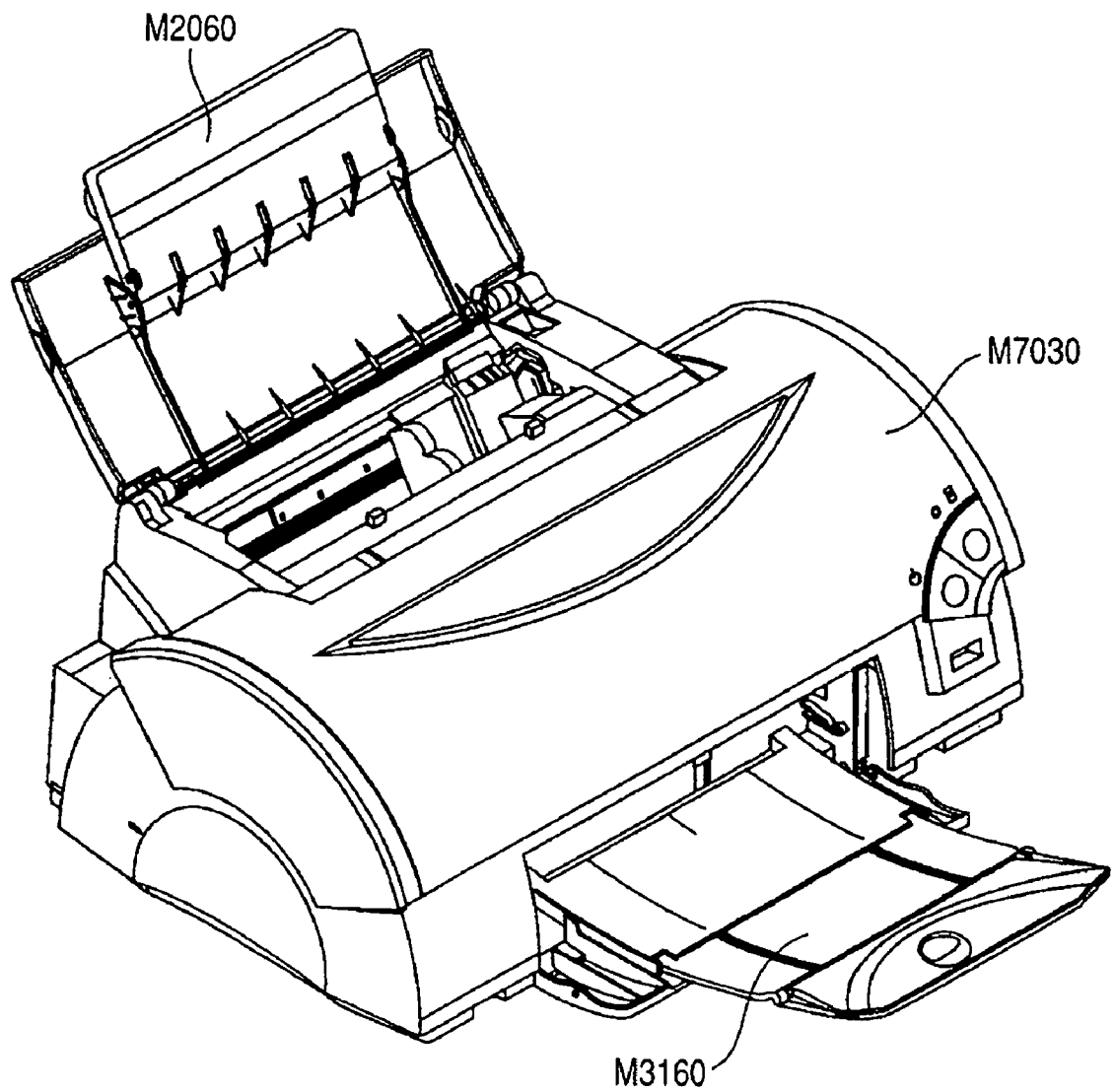
FIG. 1 is a perspective view of a recording apparatus.

Hereinafter, the present invention will be described in more detail by way of preferred embodiments.

In the present invention, when a coloring material is a salt, the salt is dissociated to ions in ink, but this state is represented by using the phrase "contains a salt" for convenience.

[Basic Technical idea of the Present Invention]

First, the evaporation of water in ink will be described. When ink is left in an environment having a certain temperature and a certain humidity, the evaporation of water in the ink does not progress until water in the ink is completely lost, and there is a correlation between humidity and the end point of evaporation.

When a saturated water vapor pressure at a certain temperature is denoted by P (mmHg), the partial pressure of water in the air is represented as P×W/100 (mmHg) with the aid of a molar fraction W (%) of water (that is, a relative humidity). With regard to the evaporation of water in an ink, when one considers that frequency of evaporation of water molecules is in proportion to a molar fraction C (%) of water in the ink, that is, that the probability that water evaporates is in proportion to the molar fraction of water, an apparent saturated water vapor pressure at the same temperature is represented as P×C/100 (mmHg). In other words, the evaporation of water shifts from higher molar fractions of water to lower molar fractions of water until W and C become equal to each other.

In other words, when the molar fraction of water in the ink is higher than the molar-fraction of water in the air (that is, a relative humidity), water in the ink evaporates until the molar fraction of water in the ink becomes equal to the molar fraction of water in the air (that is, a humidity). Equilibrium is achieved when the molar fractions of water in both the ink and the air become equal to each other, and no further evaporation of water occurs.

The above phenomenon was examined by means of a model ink having the following composition.

| | |
|---|---|
| Glycerin (having a molecular weight of 92) | 10 mass % |
| Urea (having a molecular weight of 60) | 10 mass % |
| Dye (having a molecular weight of 826) (Sodium salt of C.I. Food Black 2) | 5 mass % |
| Water (having a molecular weight of 18) | 75 mass % |

100 grams of the model ink contains 0.28 mol of a water-soluble compound except water (see the following equation).

$$10/92+10/60+5/826=0.28 \text{(mol)}$$

Meanwhile, 100 grams of the model ink contains 4.17 mol of water (see the following equation)

$$75/18=4.17 \text{(mol)}$$

The foregoing shows that the molar fraction of water in the ink is 94%. (see the following equation).

$$4.17/(0.28+4.17.)\times 100=94(\%)$$

The ink was charged into a dish and left in an environment having a humidity of 80%. Equilibrium was obtained when the molar fraction of water became 80%, that is, 55% of water evaporated. This means that the remaining amount of water is 20 mass % when 55% of water evaporates and the number of moles of water is 1.11. Therefore, the molar fraction of water is 80% which coincides with the above calculated result (see the following equation).

$$1.11/(1.11+0.28)\times 100=80(\%)$$

As described later, a purging cap of a recording head having ejection orifices of inks for respective colors integrally formed has a constitution in which ejection orifices of multiple inks are collectively capped to suppress the evaporation of water. When the ink jet recording apparatus is not used, the recording head is capped with the purging cap. In addition, a purging recovery operation is performed as required, for example, when the ink jet recording apparatus is used.

By the way, a nearly enclosed space is established in the cap in close contact with the recording head, and the inside of the cap reaches a saturated state owing to water evaporated from ink. Although it is difficult to actually measure the humidity inside the cap, it can be assumed that an averaged state is obtained as a result of the balance of water evaporation from inks for respective colors, that is, for the inks for respective colors in the cap, evaporation is in equilibrium in the inks and the cap. If there is a large difference in molar fraction of water between any two of the inks for respective colors, water preferentially evaporates from an ink having a high molar fraction of water. As a result, ink components are concentrated at the tip of a nozzle for the ink having a high molar fraction of water. On the other hand, water vapor in a saturated state is contained as water in an ink having a low molar fraction of water so ink components are diluted at the tip of a nozzle for the ink having a low molar fraction of water.

As described above, the phenomenon in which the molar fraction of water in ink changes depending on a relationship between the molar fraction of water in the ink and the humidity of an environment in which the ink is placed is a phenomenon which may occur, for example, in the case where ink in an ink cartridge is in contact with the air as in the case of the inside of a cap in close contact with a recording head. However, a situation where multiple inks having different molar fractions of water are present in a cap is a severe situation in terms of change in molar fraction of water. This is because, when multiple inks are present in a cap, a phenomenon is highly apt to occur as described above, in which the molar fraction of water reduces when an ink having a low molar fraction of water reaches equilibrium, while the molar fraction of water increases when an ink having a high molar fraction of water reaches equilibrium.

To solve the above problem, for example, a purging recovery operation is surely performed immediately before printing. With this operation, a portion printed at an early stage of printing can be prevented from becoming concentrated for concentrated inks and a portion printed at an early stage of printing can be prevented from becoming pale for diluted inks. However, when a purging recovery operations is surely performed immediately before printing, ink will be wasted in an amount more than necessary, so this approach is not preferable in terms of cost and printing speed.

In view of the above, the inventors of the present invention have made studies about ink applicable to an ink jet recording apparatus having a constitution in which ejection orifices for two or more kinds of inks in a recording head are capped with one cap part. The inventors have paid attention to the molar fraction of water in each of multiple inks for use in an ink jet recording apparatus having multiple openings to each of which each of the multiple inks is supplied and a cover member with which the multiple openings are covered to form a closed space. As a result, the inventors have concluded that such inconvenience of an image as described above can be eliminated by setting a difference between a maximum molar fraction of water and a minimum molar fraction of water in the respective inks to be 5% or less.

The ink of the present invention is a second ink to be used in combination with a first ink having a molar-fraction of water of N (%) to a water-soluble compound having a molecular weight of 300 or less. The second ink is characterized in that the molar fraction of water of the second ink is different from N (%) and is N −5(%) or more and N+5(%) or less.

The term "molar fraction of water to a water-soluble compound having a molecular weight of 300 or less" as used herein refers to the molar fraction of water in each color represented by the following equation (1) when the molecular weights of water-soluble compounds 1, 2, 3, . . . , m, and n each having a molecular weight of 300 or less in at least one kind of ink are denoted by $MW_1$, $MW_2$, $MW_3$, $MW_m$, and $MW_n$, the contents (mass %) of the compounds in the ink are denoted by $C_1$, $C_2$, $C_3$, . . . , $C_m$, and $C_n$, and the mass % of water is denoted by $C_w$.

Molar fraction N (%) of water=$((C_w/18)/(C_w/18+C_1/MW_1+C_2/MW_2+C_3/MW_3+ \ldots +C_m/MW_m+C_n/MW_n))$      Eq. ((1)

(Provided that none of the multiple inks contains n kinds of compounds simultaneously, and one ink of at least two kinds of inks contains a water-soluble compound X which is not present in the other ink.)

The ink of the present invention is characterized in that in inks to be used in combination with the ink of the present invention the difference between a maximum and minimum molar fractions N (%) of water is determined by means of the above equation (1) is not 0% and is 5% or less. The difference between the maximum and minimum molar fractions N (%) of water is determined by means of the above equation (1) is more preferably 3% or less. The above constituent feature enables an image causing no color unevenness to be outputted even if no purging recovery operation is performed prior to printing. It should be noted that the difference of 0% is eliminated in order to exclude inks in which only a coloring material in ink composition for each color is changed and which have the same composition except the coloring material, that is, inks in which properties of coloring materials are not sufficiently taken into consideration and which do not satisfy a high level of technical-standard requested for a recent ink jet recording method like inks constituting a conventional ink set.

The molecular weight of the water-soluble compound X is preferably 70 or less because the molar fraction (%) in ink is relatively large as compared to the content (mass %) of the water-soluble compound, so an effect of the present invention can be obtained with increased efficiency.

In the present invention, it is preferable in terms of efficiency to take into consideration water-soluble compounds 1, 2, 3, . . . , m, and n each having a molecular weight of 300 or less the contents $C_1$, $C_2$, $C_3$, . . . , $C_m$, and $C_n$ (mass %) of which in ink are each 1% or more.

In the present invention, only a water-soluble compound having a molecular weight of 300 or less is taken into consideration in calculating the molar fraction N (%) of water. This is because setting the molecular weight of a water-soluble compound to be, taken into consideration to 300 or less enables the present invention to be embodied simply and easily. The foregoing means that it is sufficient to take into consideration a water-soluble compound having a molecular weight of 300 or less (the content of which is preferably 1 mass % or more) out of the water-soluble compounds to be incorporated into ink in order to embody the effect of the present invention (that is, a compound having a molecular weight in excess of 300, that is, a compound having a molecular weight sufficiently large as compared to the molecular weight of water has substantially no influence on the value of the molar fraction of water).

In addition, the ink of the present invention and all inks to be used in combination with the ink each preferably have a viscosity of 3 mPa·s or less because the effect of the present invention can be obtained with increased efficiency. This is because, when a water-soluble compound has a large content in ink and has a high viscosity, the molar fraction of water is relatively small, so the effect of the present invention is hardly obtained. The value 3 mpa·s is obtained by counting fractions of 0.5 and over as a unit and cut away the rest.

[Calculation of Molar Fraction]

Any one of the following analysis approaches can be used for calculating the molar fraction of each component in ink.

(1) Water content: Karl Fischer moisture titrator, or the like (2) Content of water-soluble compound such as water-soluble organic solvent: High performance liquid chromatography, gas chromatography, or the like (3) Molecular weight of water-soluble compound such as water-soluble organic solvent: M/Z (posi, nega) in mass spectrum or the like.

The gist of the present invention lies in that a substantial difference in molar fraction of water between inks can be measured by means of the following method. That is, a combination of at least two kinds of inks one of which contains a water-soluble compound X which is not present in the other ink is left in, for example, an environment having a relative humidity of 80% until the evaporation of water reaches equilibrium. At this time, the mass of each ink before left and the mass of the ink after left are measured. It can be said that the constitution of the present invention is satisfied when the difference between a maximum change in mass of each ink and a minimum change in mass of each ink is 5% or less, or more preferably 3% or less.

[Ink Jet Recording Apparatus Having Openings and a Cover Member with Which the Opening is Covered to Form a Closed Space]

Figure 7A:
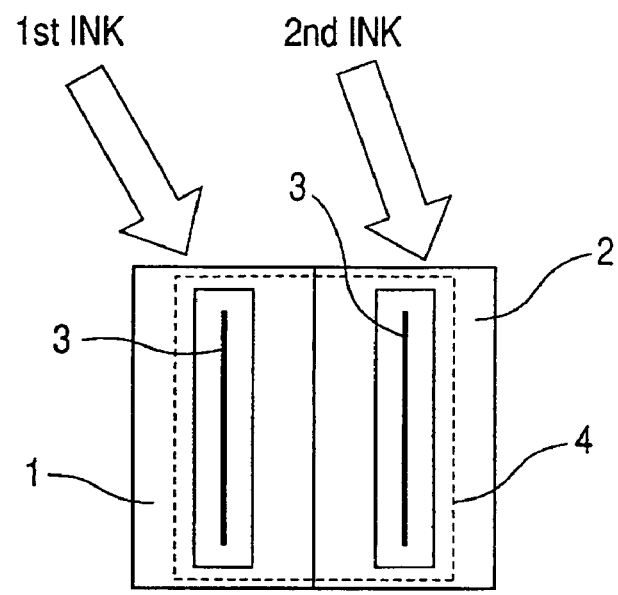
FIGS. 7A and 7B are conceptual views each showing an embodiment of the present invention.
Figure 7B:
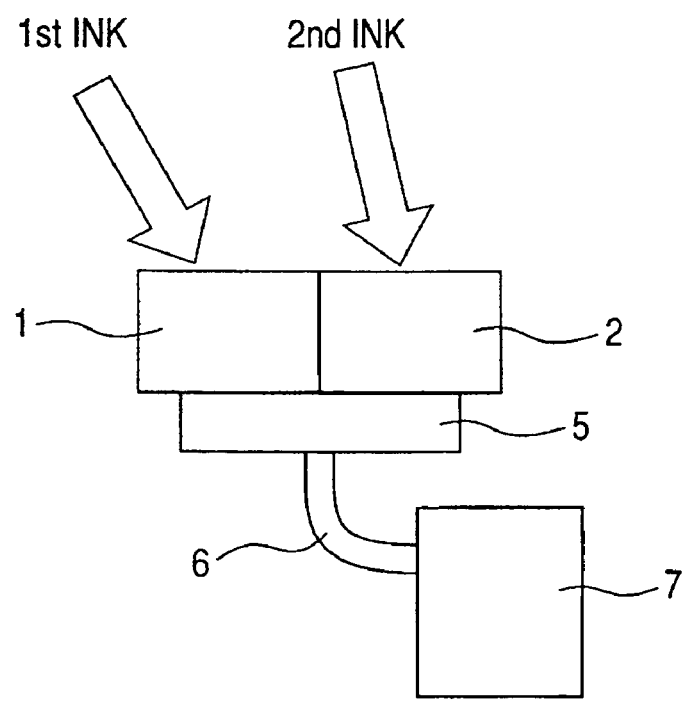

FIGS. 7A and 7B are conceptual views each showing a part of an ink jet recording apparatus having openings and a cover member with which the, openings are covered to form a closed space. FIG. 7A. is a front view of openings 3 to be covered with a cover member 5. FIG. 7B is a side view showing a state where the openings 3 are covered with the cover member 5. In each of FIGS. 7A and 7B, reference numeral 1 denotes a head;. 2, another head; 3, the opening; 4, a portion where the openings are covered with the cover member; 5, the cover member; 6, a tube; and 7, a purging pump.

In each of FIGS. 7A and 7B, a recording head is divided into the head 1 having a first opening to which a first ink is supplied and the head 2 having a second opening to which a second ink is supplied. The recording head has the portion 4 where both the openings are entirely covered with the single cover member 5. In this embodiment, the recording head divided into the head 1 having the first opening to which the first ink is supplied and the head: 2 having the second opening to which the second ink is supplied has been shown. Of course, in the present invention, the recording head may be structured in any manner as long as it has multiple openings and a single cover member with which the openings are entirely covered.

In this embodiment, the cover member 5 is connected to the purging pump 7 through the tube 6, and functions as a purging cap. Of course, the cover member 5 may function as a cap to be left instead of a purging cap.

<Ink>

Hereinafter, the respective components constituting the ink of the present invention will be described.

(Water-soluble Compound to be Used for Ink: Coloring Material)

Specific examples of a coloring material that can be used for the ink of the present invention are shown below. A conventionally known coloring material or a coloring material newly synthesized can be used. Of course, the present invention is not limited to these examples.

[Yellow Coloring Material]

C.I. Direct Yellow: 8, 11, 12, 27, 28, 33, 39, 44, 50, 58, 85, 86, 87, 88, 89, 98, 100, 110, 132, and 173, etc.

C.I. Acid Yellow: 1, 3, 7, 11, 17, 23, 25, 29, 36, 38, 40, 42, 44, 76, 98, and 99, etc.

C.I. Pigment Yellow: 1, 2, 3, 12, 13, 14, 15, 16, 17, 73, 74, 75, 83, 93, 95, 97, 98, 114, 128, 138, and 180, etc.

Compounds described in the pamphlets of WO 99/43754 and WO 02/081580

A preferable specific example of the coloring material represented by the general formula (I) includes Exemplified Compound Y1 below. Of course, the present invention is not limited to this.

General formula (I)

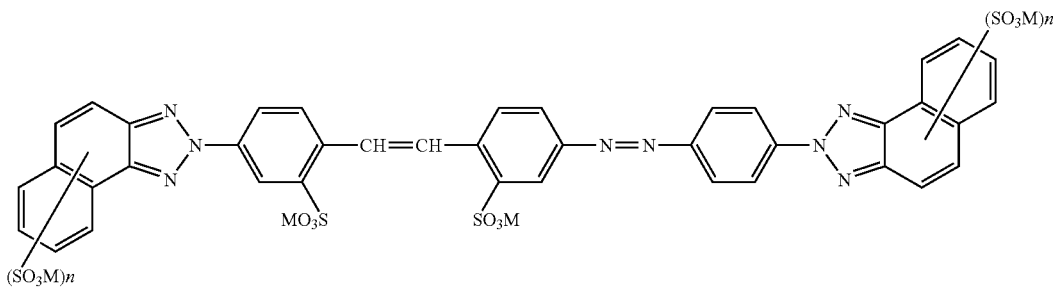

(In the general formula (I), M's each independently represent a hydrogen atom, an alkali: metal; an alkali earth metal, a cation of organic amine or an ammonium ion, and n's each independently represent 1 or 2.)

Specific examples of the coloring material represented by the general formula (I) include compounds each having a structure shown in Table 1 below. Of course, the present invention is not limited to them. In Table 1, the substitution position of a sulfone group is represented as an A ring or a B ring as shown in the following general formula (I-1) for convenience. The substitution position of a sulfone group is as defined in the following general formula (I-1)

General formula (I-1)

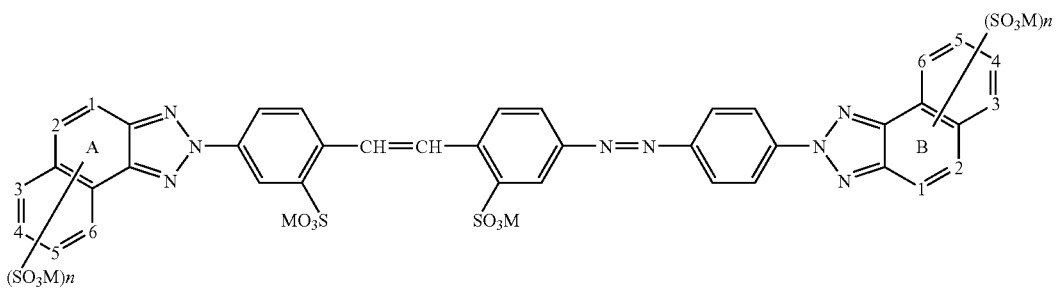

(In the general formula (I-1), M's each independently represent a hydrogen atom, an alkali metal, an alkali earth metal, a cation of organic amine or an ammonium ion, and n's each independently represent 1 or 2.)

TABLE 1

| | | Position of substituent | |
|---|---|---|---|
| | | A ring | B ring |
| Exemplified Compound | Y1 | 2 | 4 |
| | Y2 | 4 | 4 |
| | Y3 | 2 | 4, 6 |
| | Y4 | 4, 6 | 4 |

Exemplified Compound Y1

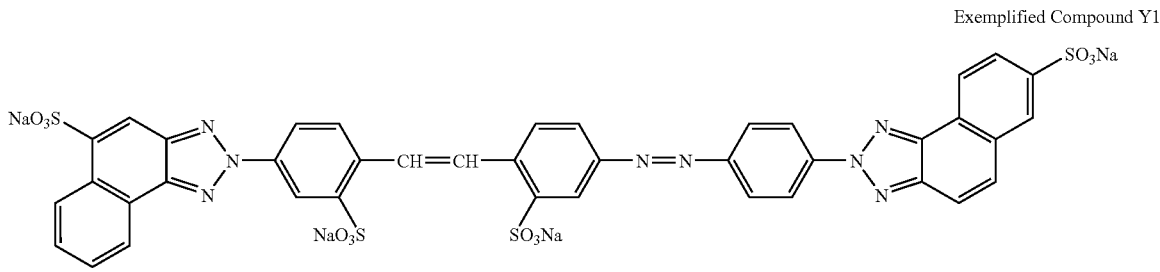

[Magenta Coloring Material]

C.I. Direct Red 2, 4, 9, 11, 20, 23, 24, 31, 39, 46 62, 75, 79, 80, 83, 89, 95, 197, 201, 218, 220, 224, 225, 226, 227, 228, 229, and 230, etc.

C.I. Acid Red: 6, 8, 9, 13, 14, 18, 26, 27, 32, 35 42, 51, 52, 80, 83, 87, 89, 92, 106, 114, 115, 133, 134, 145; 158, 198, 249, 265, and 289, etc.

C.I.,Food Red 87, 92, and 94, etc.

C.I. Direct Violet: 107

C.I. Pigment Red: 2, 5, 7, 12, 48:2, 48:4, 57:1, 112, 122, 123, 168, 184, and 202, etc.

group, or a cyano lower alkyl group; Y represents a chlorine atoms a hydroxyl group, an amino group, or a monoalkylamino or dialkylamino group (which may have a substituent selected from the group consisting of a sulfonic group, a darboxyl group, and a hydroxyl group on an alkyl group); and $R_2$, $R_3$, $R_4$, $R_5$, and $R_6$ each independently-represent a hydrogen atom, an alkyl group having 1 to 8 carbon atoms, or a carboxyl group (provided that $R_2$, $R_3$, $R_4$, $R_5$, and $R_6$ cannot simultaneously represent hydrogen atoms).)

Preferable examples of the compound represented by the general formula (II) or the salt thereof include Exemplified Compounds M1 to M7 below. Of course, the present invention is not limited to the following compounds. All the solubilizing groups in the following exemplified compounds are represented in H forms, but may form salts.

General formula (II)

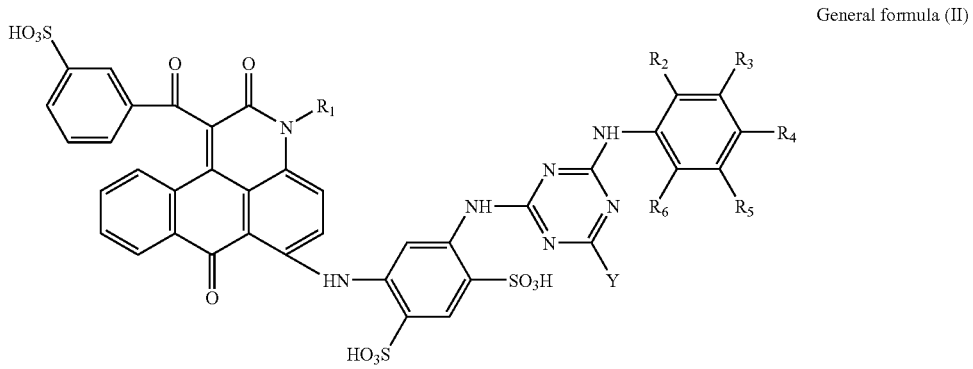

(In the general formula (II): $R_1$ represents a hydrogen atom, an alkyl group, a hydroxy lower alkyl group, a cyclohexyl group, a monoalkyl-aminoalkyl or dialkyl aminoalkyl Exemplified Compounds M1 to M7
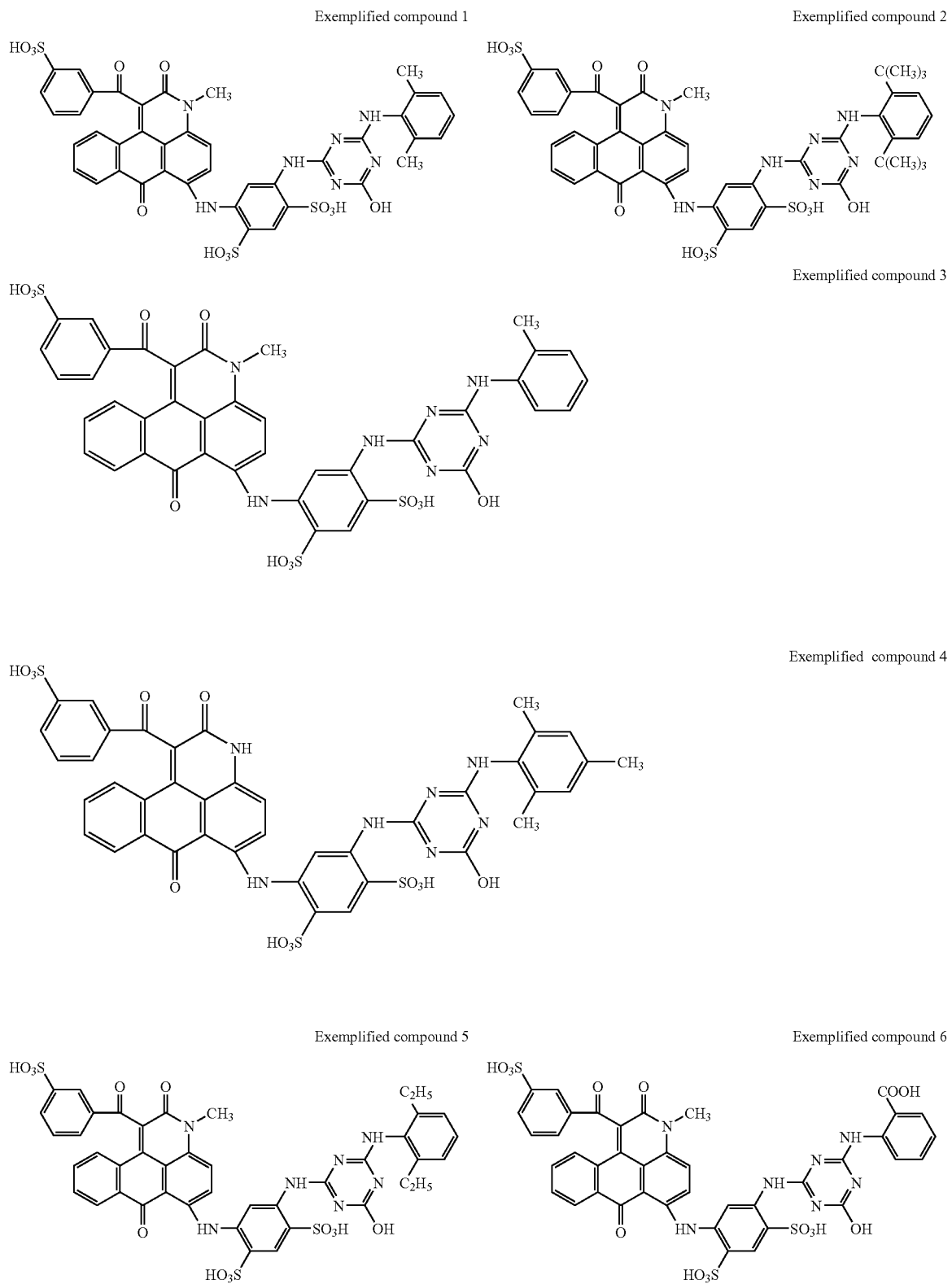

-continued

Exemplified compound 7

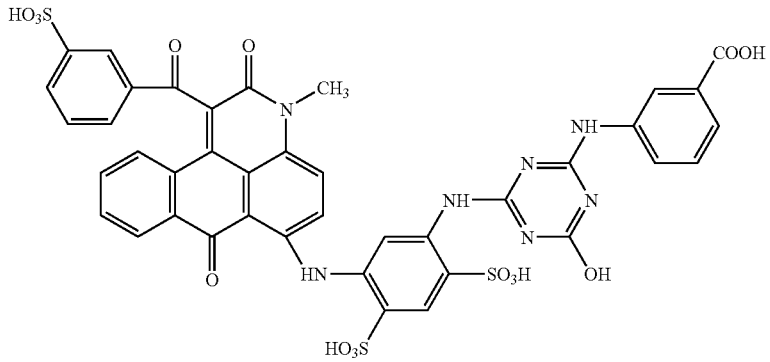

Of the above exemplified compounds, Exemplified Compound A below, which is a sodium salt of Exemplified Compound M6, is particularly preferably used.

Exemplified Compound A

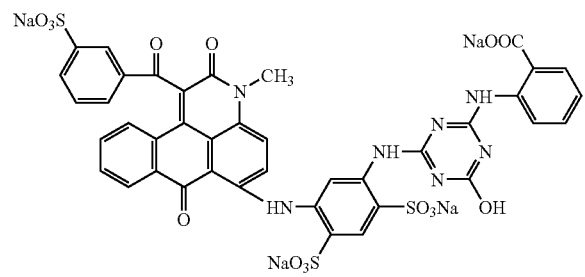

[Cyan Coloring Material]

C.I. Direct Blue: 1, 15, 22, 25, 41, 76, 77, 80, 86, 90, 98, 106, 108, 120, 158, 163, 168, 199; 226, and 307, etc.

C.I. Acid Blue; 1, 7, 9, 15, 22, 23, 25, 29, 40, 43, 59, 62, 74, 78, 80, 90, 100, 102, 104, 112, 117, 127, 138, 158, 161, 203, 204, 221, and 244, etc.

C.I. Pigment Blue: 1, 2, 3, 15, 15:2, 15:3, 15:4, 16, 22, and 60, etc.

(In the general formula (III): M represents an alkali metal or ammonium; $R_1$ and $R_2$ each independently represent a hydrogen atom, a sulfonic group, or a carboxyl group (provided that $R_1$ and $R_2$ cannot simultaneously represent hydrogen atoms); Y represents a chlorine atom, a hydroxyl group, an amino group, or a monoalkylairino or dialkylamino group; 1 represents 0 to 2, m represents 1 to 3, and n represents 1 to 3 (provided that 1+m +n=3 to 4); and positions at which substituents are present are the 4-position or 4'-position.)

The coloring material is a phthalocyanine derivative prepared by selectively introducing an unsubstituted sulfamoyl group (—$SO_2NH_2$) or a substituted sulfamoyl group (a group represented by a general formula (IV) to each of only 4- and 4'-positions in the general formula (III) A phthalocyanine compound prepared by reacting a 4-sulfophthalic acid derivative, or a 4-sulfophthalic acid derivative and a phthalic acid (anhydride) derivative, in the presence of a metal compound is used as a raw material for synthesizing a compound represented by the general formula (III). A sulfonic group in the phthalocyanine compound is transformed into a chlorosulfonic group, and then an amination agent is allowed to react with the resultant in the presence of an organic amine to synthesize the compound.

General formula (III)

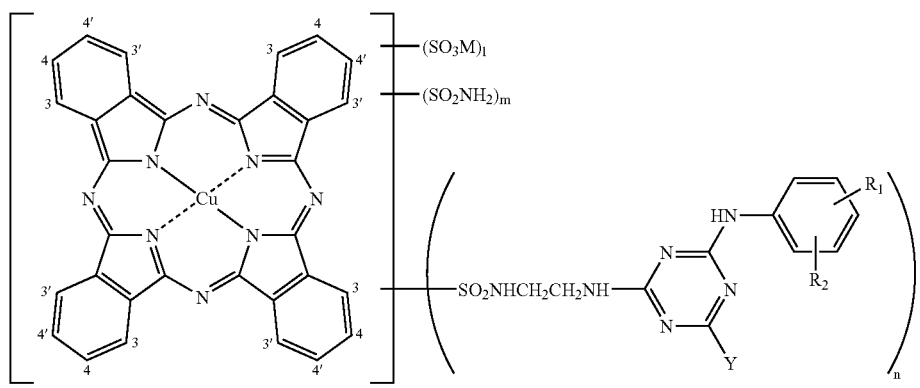

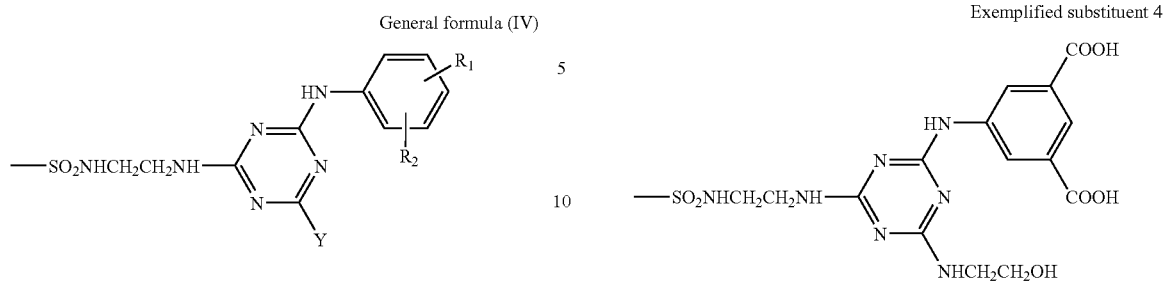

General formula (IV)

Preferable specific examples of the substituted sulfamoyl group represented by the general formula (IV) are shown below. Of course, the substituted, sulfamoyl group to be used in the present invention is not limited thereto. The substituted sulfamoyl group represented by the general formula (IV) is shown in the form of a free acid.

Exemplified Substituents 1 to 7

Of those, a compound substituted by Exemplified Substituent 1 above, that is, Exemplified compound C1 is most preferable because of its balance between color developability and environmental gas resistance.

Exemplified Compound C1

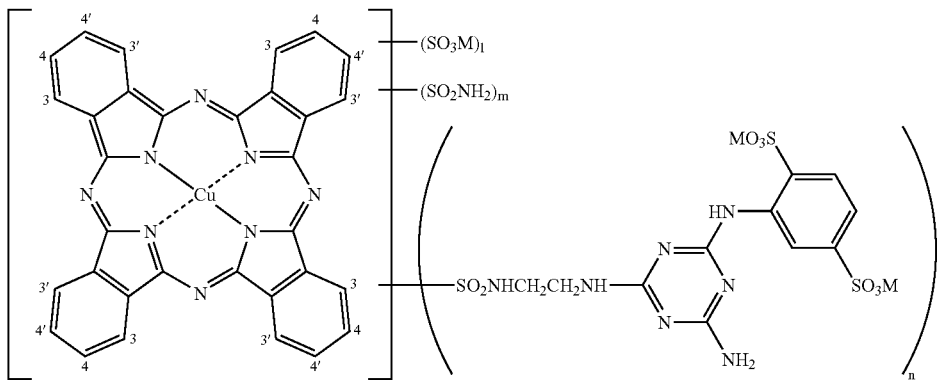

[Orange Coloring Material]

C.I. Acid Orange: 7, 8, 10, 12, 24, 33, 56, 67, 74, 88, 94, 116, and 142, etc.

C.I. Acid Red: 111, 114, 266, and 374, etc.

C.I. Direct Orange: 26, 29, 34, 39, 57, 102, and 118, etc.

C.I. Food Orange: 3, etc.

C.I. Reactive Orange: 1, 4, 5, 7, 12, 13, 14, 15, 16, 20, 29, 30, 84, and 107, etc.

C.I. Disperse Orange: 1, 3, 11, 13, 20, 25, 29, 30, 31, 32, 47, 55, and 56; etc.

C.I. Pigment Orange: 43, etc.

C.I. Pigment Red: 122, 170, 177, 194, 209, and 224, etc.

[Green Coloring Material]

C.I. Acid Green: 1, 3, 5, 6, 9, 12, 15, 16, 19, 21, 25, 28, 81, and 84, etc.

C.I. Acid Blue: 62, 80, 83, 90, 104, 112, 113, 142, 203, 204, 221, and 244, etc.

C.I. Reactive Blue: 49, etc.

C.I. Acid Violet: 17, 19, 48, 49, 54, and 129, etc.

C.I. Direct Violet: 9, 35, 47, 51, 66, 93, 95, and 99, etc.

C.I. Reactive Violet: 1, 2, 4, 5, 6, 8, 9, 22, 34, and 36, etc.

C.I. Disperse Violet: 1, 4, 8, 23, 26, 28, 31, 33, 35, 38, 48, and 56, etc.

C.I. Pigment Blue: 15:6, etc.

C.I. Pigment Violet: 19, 23, and 37, etc.

[Black Coloring Material]

C.I. Direct Black: 17, 19, 22, 31, 32, 51, 62, 71, 74, 112, 113, 154, 168, and 195 etc.

C.I. Acid Black: 2, 48, 51, 52, 110, 115, and 156, etc.

C.I. Food Black: 1 and 2, etc. Carbon black

General formula (V)

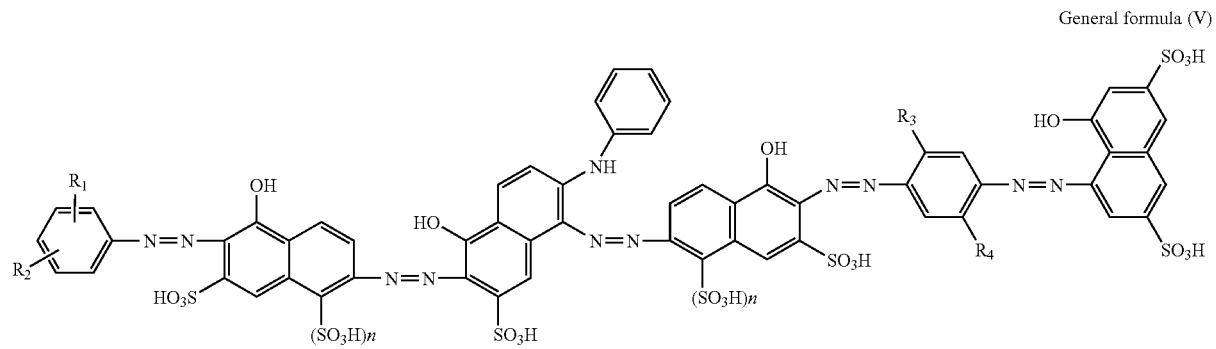

C.I. Direct Green: 26, 59, and 67, etc.

C.I. Food Green: 3 etc.

C.I. Reactive Green: 5, 6, 12, 19, and 21, etc.

C.I. Disperse Green: 6 and 9, etc.

C.I. Pigment Green: 7 and 36, etc.

[Blue Coloring Material]

(In the general formula (V), $R_1$ and $R_2$ each independently represent a hydrogen atom, a hydroxyl group, an amino group, a carboxyl group, a sulfonic group, an alkyl group having 1 to 4 carbon atoms, or an alkoxy group having 1 to 4 carbon atoms; $R_3$ and $R_4$ each independently represent a hydrogen atom, an alkyl group having 1 to 4 carbon atoms, an alkoxy group having unto 4 carbon atoms, a hydroxyl group, an alkyl group having 1 to 4 carbon-atoms which may be substituted by a hydroxyl group or an alkoxy group having 1 to 4 carbon atoms, an alkoxy group having 1 to 4 carbon atoms which may be substituted by a hydroxyl group, an alkoxy group having 1 to 4 carbon atoms, a sufonic group, or a carboxyl group, or an amino group substituted by an alkyl group or an acyl group; and n represents 0 or 1.)

acids as specific examples of the dye represented by the general formula (VI). However, the coloring material to be used in the present invention is not limited to them. Two oar more kinds of such coloring materials as given below may General formula (VI)

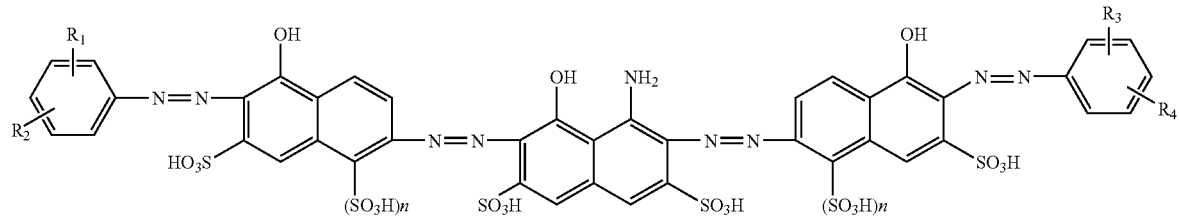

(In the general formula (VI), $R_1$, $R_2$, $R_3$ and $R_4$ each independently represent a hydrogen atom, a hydroxyl group, an amino group, a carboxyl group, a sulfonic group, an alkyl group having 1 to 4 carbon atoms, an alkoxy group having 1 to 4 carbon atoms, an alkoxy group substituted by a hydroxyl group, an alkoxy group having 1 to 4 carbon atoms, a sulfonic group or a carboxyl group, an alkoxy group having 1 to 4 carbon atoms which may be additionally substituted by a carboxyl group or a sulfonic group, or an amino group substituted by a phenyl group, an alkyl group or an acyl group; and n represents 0 or 1.)

Exemplified Compounds Bk1 to Bk3 are given below in the forms of free acids as specific examples of the dye represented by the general formula (V), and Exemplified Compounds Bk4 to Bk6 are given below in the forms of free be used simultaneously. It is particularly preferable to use Exemplified Compound Bk3 and Exemplified Compound Bk4 simultaneously.

Exemplified Compounds Bk1 to Bk3 are given below as specific examples of the compound represented by the general formula (V) or the salt thereof, and Exemplified Compounds Bk4 to BK6 are given below as specific examples of the compound represented by the general formula (VI) or the salt thereof. However, the present invention is not limited to the following compounds. Two or more kinds of coloring materials may be used simultaneously. In the present invention, it is particularly preferable to use Exemplified Compound Bk3 and Exemplified Compound Bk4 in combination. Exemplified Compounds Bk1 to Bk6

Exemplified compound Bk1

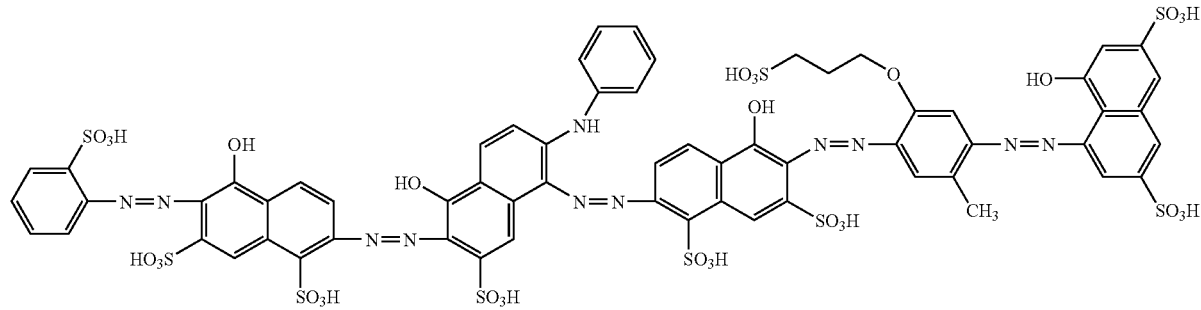

Exemplified compound Bk2

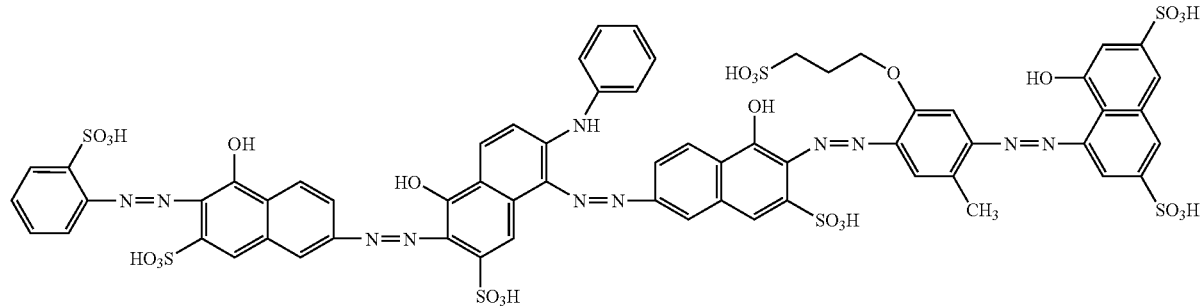

-continued

Exemplified compound Bk3
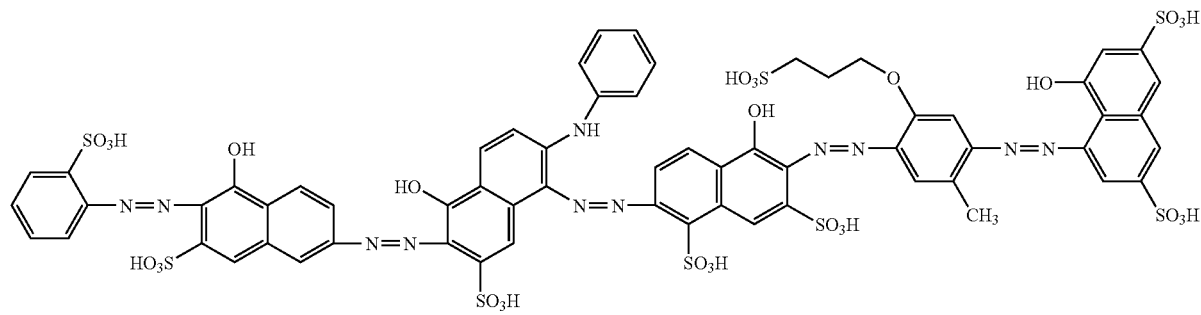

Exemplified compound Bk4
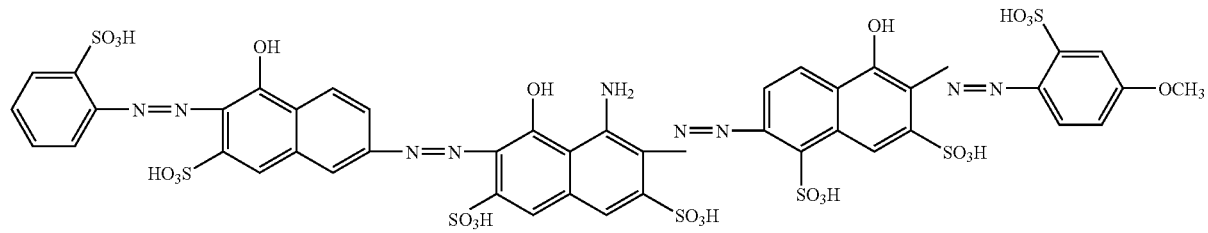

Exemplified compound Bk5
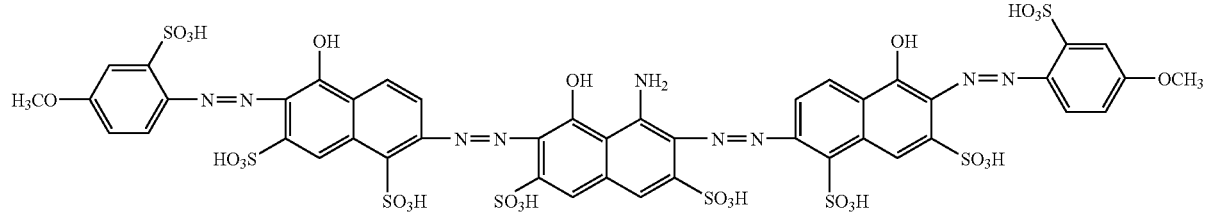

Exemplified compound Bk6
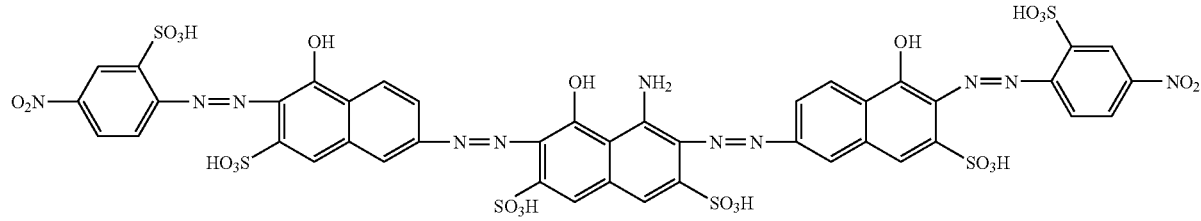

(Water-soluble Compound to be Used for Ink: Aqueous Medium)

The ink of the present invention can use an aqueous medium as a mixed solvent of water and any one of various water-soluble organic solvents. At this time, the contents of water and the water-soluble organic solvent needs to be adjusted in such a manner that the above-described molar fraction of water can be obtained.

The water-soluble organic solvents are not particularly limited as long as they are water-soluble, and examples of an available water-soluble organic solvent include an alcohol polyhydric alcohol, pglyglycol, glycol ether, a nitrogen-containing polar solvent, and a sulfur-containing polar solvent. Specific examples thereof include: alkyl alcohols each having 1 to 4 carbon atoms such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones or keto alcohols such as acetone and diacetone alcohol; ethers such as tetrahydrofuran and dioxane; polyalkylene glycols such as polyethylene glycol and polypropylene glycol; alkylene glycol s in each of which an alkylene group has 2 to 6 carbon atoms such as ethylenelglycol, propylene glycol, butylene glycol, triethylene-glycol, glycerin, 1,2,6-hexane triol, thio diglycol, hexylene glycol, and diethylene glycol; lower alkyl ether acetates such as polyethylene glycol monomethyl ether acetate; lower alkyl ethers of polyhydric alcohols such as ethylene glycol monomethyl (or ethyl) ether, diethylene glycol methyl (or ethyl) ether, and triethylene glycol monomethyl (or ethyl) ether; polyhydric alcohols such as trimethylolpropane and trimethylolethane; N-methyl-2-pyrrolidone; 2-pyrrolidone; and 1,3-dimethyl-2-imidazolidinone. Of course, the present invention is not limited thereto. Each of the water-soluble organic solvents may be used alone, or two or more of them may be used as a mixture. In addition, deionized water (ion-exchanged)is preferably used as water.

The total content of those water-soluble organic solvents is preferably 5 mass % to 90 mass %, or more preferably 10 mass % to 50 mass % with respect to the total mass of the ink. The reason for this is Was follows. A content less than this range may cause the deterioration of reliability, such as ejection property when the ink of the present invention is used as ink jet ink, while a content in excess of this range may cause insufficient supply of ink due to an increase in viscosity of the ink. The water content is preferably 10 mass % to 90 mass % with respect to the total mass of the ink.

(Water-soluble Compound to be used for Ink: Other Additive.)

In the present invention, various additives such as a surfactant, a pH adjuster, a rust inhibitor, an antiseptic, an antifungus agent, an antibxidant, an antireducing agent, an evaporation accelerator, a chelating agent, and a water-soluble polymer may be added as required.

<Recording Medium>

Any recording medium can be used for forming an image by means of the ink of the present invention as long as recording is performed by applying the ink to the recording medium.

The present invention is applicable to a recording medium in which a coloring-material such as a dye is adsorbed to a fine particle forming a porous-structure in an ink-receiving layer and an image is formed from at least the fine particle having adsorbed thereto the coloring material, and the present invention is particularly suitable for the case where an ink jet method is used Such ink jet recording medium is preferably of a so-called absorption type in which ink is absorbed by a gap formed in an ink-receiving layer on a support.

An absorption type ink-receiving layer is constituted as a porous layer mainly composed of a fine particle and containing a binder and any other additive as required. Specific examples of the fine particle include inorganic pigments such as silica, clay, talc, calcium carbonate, kaolin, aluminum oxide (for example, alumina or alumina hydrate), diatomaceous earth, titanium oxide, hydrotalcite, and zinc oxide; and organic pigments such as a urea formalin resin, an ethylene resin, and a styrene resin. One or more kinds of them are used. Examples of a binder that is suitably used include a water-soluble polymer and a latex. Examples of an available binder include polyvinyl alcohol or a modified product thereof; starch or a modified product thereof; gelatin or a modified product thereof; gum arabic; cellulose derivatives such as carboxymethylcellulose, hydroxyethylcellulose, and hydroxyproylmethylcellulose; vinyl-based copolymer latexes such as an SBR latex, an NBR latex, a methyl methacrylate-butadiene copolymer latex, a functional-group-modified polymer latex, and an ethylene-vinyl acetate copolymer; polyvinyl pyrrolidone; maleic anhydride or a copolymer thereof; and an acrylate copolymer. Two or more kinds of them can be used in combination as required. In addition, an additive may be used, and examples of an additive to be used as required include a dispers ant, a thickener, a pH adjustor, a lubricant, a fluidity modifying agent, a surfactant, a defoaming agent, a releasing agent, a fluorescent bleach, a UV absorber, and an antioxidant.

In particular, a recording medium having an ink-receiving layer formed therein mainly composed of fine particles having an average particle size of 1 μm or less is preferably used in the present invention. Particularly preferable examples of the fine particles include silica fine particles and aluminum oxide fine particles. Preferable silica fine particles are silica fine particles typified by colloidal silica. Colloidal silica, which itself is available from the market, is particularly preferably that described in JP 2803134 B or JP 2881847 B. Preferable aluminum oxide fine particles are alumina hydrate fine particles and the like. An alumina hydrate represented by the following general formula can be exemplified as one example of such alumina hydrate fine particles;

$AlO_{3-n}(OH)_{2n} \cdot mH_2O$ (In the formula, n-represents an integer of 1, 2, or 3, and m represents a value of 0 to 10, or preferably 0 to 5; provided, however, that m and n cannot be simultaneously 0. m may be or may not be an integer because $mH_{2O}$ represents an aqueous phase that can desorb and is not involved in the formation of an $mH_2O$ crystal lattice as well in many cases. In addition, heating such kind of material may cause m to reach 0.)

An alumina hydrate can be produced by means of a conventionally known method such as the hydrolysis of, aluminum alkoxide or sodium aluminate described in U.S. Pat. No. 4,242,271 or U.S. Pat. No. 4,202,870; or a method involving adding an aqueous solution of sodium sulfate, aluminum chloride, or the like to an aqueous solution of sodium aluminate or the like to perform neutralization described in JP 57-44605 B.

The recording medium preferably has a support for supporting the above-described ink-receiving layer. Any support can be used without any particular limitation as long as its ink-receiving player can be formed of the above-described porous fine particles and the support provides rigidity such that the support can be conveyed by a conveying mechanism of an ink jet printer or the like. Specific examples thereof include a paper support formed of a pulp raw material mainly composed of natural cellulose fibers a plastic support composed of a material such as polyester (for example, polyethylene terephthalate), cellulose triacetate, polycarbonate, polyvinyl chloride, polypropylene, or polyimide; resin-coated paper (for example, RC paper) having, on at least one side of base paper, a polyolefin resin coating layer added with a white pigment or the like.

<Ink Set>

The ink of the present invention can be preferably used in combination with any other ink to provide an ink set. The term "ink set" asbused herein refers to a state where the ink of the present invention is used in combination with any other ink such as cyan ink, magenta ink, yellow ink, or black ink. There is no particular limitation on the other ink that can be used in combination with the ink of the present invention to provide an ink set. The term "ink set" as used herein includes, of course, an ink tank itself having multiple ink tanks integrated with each other. Furthermore, the term includes a state where multiple ink tanks are used in combination and a state where these ink tanks and a recording head are integrated.

<Ink Jet Recording Method>

The ink according to the present invention is particularly suitably used for an ink jet recording method including ejecting the ink by an ink jet method. Examples of the ink jet recording method include a recording method involving applying mechanical energy to ink to eject the ink and a recording method involving applying thermal energy to ink to eject the ink. An ink jet recording method involving the use of thermal energy is particularly preferably used in the present invention.

<Ink Cartridge>

An example of an ink cartridge suitable for performing recording by means of the ink according to thee present invention includes an ink cartridge including an ink storage portion for storing the ink.

In the present invention, an ink cartridge having a substantially equal difference in amount of evaporation between any two liquid chambers for inks constituting an ink set can be preferably used in the present invention. The phrase "a substantially equal difference in amount of evaporation between any two liquid chambers for inks constituting an ink set" refers to a state where a difference in evaporation rate between any two liquid chambers becomes about 1% or less, for example, when the evaporation rate of water incorporated into each of the liquid chambers is measured.

Figure 8:
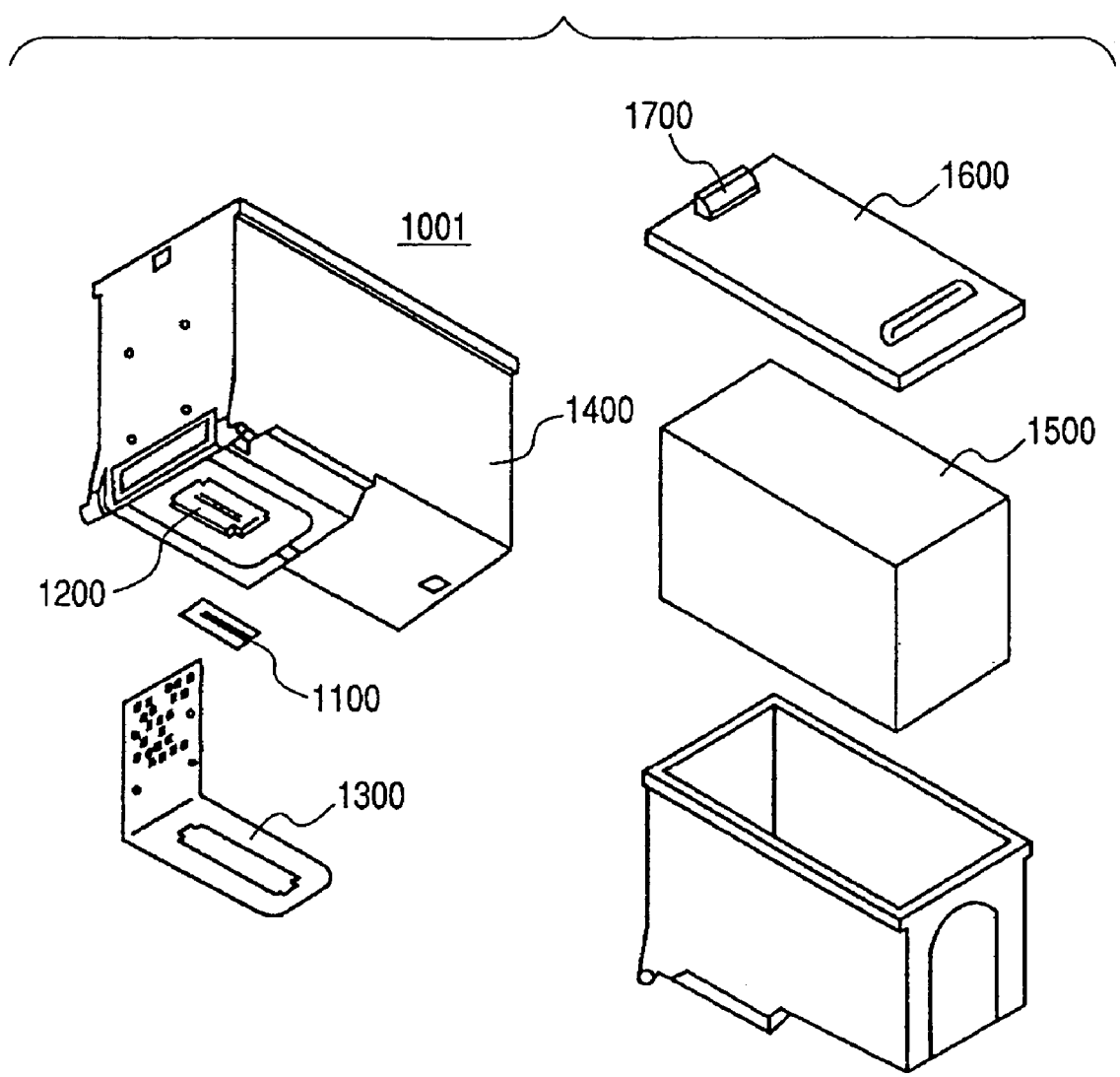
FIG. 8 is an exploded view of a recording head.

FIG. 8 is an exploded view of a recording head that can be used for the present invention. The recording head shown in FIG. 8 is integrated with an ink tank. A recording head 1001 is supported by and fixed to carriage positioning means mounted on an ink jet recording apparatus main body and an electrical contact, and is detachable to a carriage. The recording head is replaced when mounted ink is consumed.

The recording head 101, which is intended for the ejection of ink, is constituted by a recording element substrate 1100 on which ink supply orifices are formed in parallel; an electric wiring tape 1300 for forming an electrical signal path through which an electrical signal for ejecting ink is applied; an ink supply/hold member 1400 formed by molding a resin; an ink absorbent 1500 for generating a negative pressure for holding the ink; and a cap member 1600.

The ink supply/hold member 1400 has a space for holding the absorbent 1500 for generating a negative pressure for holding cyan, magenta, and yellow inks in the absorbent to provide a function as an ink tank, and forms an independent ink flow path for introducing ink to the ink supply orifices of the recording element substrate 1100 to provide an ink supply function. An ink supply orifice 1200 for supplying ink to the recording element substrate 1100 is formed at a downstream portion of the ink flow path, and the recording element substrate 1100 is fixed to the ink supply/hold member 1400 in such a manner that the ink supply orifices of the recording element substrate 1100 are in communication with the ink supply orifice 1200 of the ink supply/hold member 1400. In addition, the rear surface of part of the electric wiring tape 1300 is fixed to the plane around the vicinity of the ink supply orifice 1200. The cap member 1600 is welded to an upper opening of the ink supply/hold member 1400 to close the space inside the ink supply/hold member 1400. The cap member 1600 has an engagement portion 1700 for fixing the recording head to an ink-jet recording apparatus.

Figure 9:
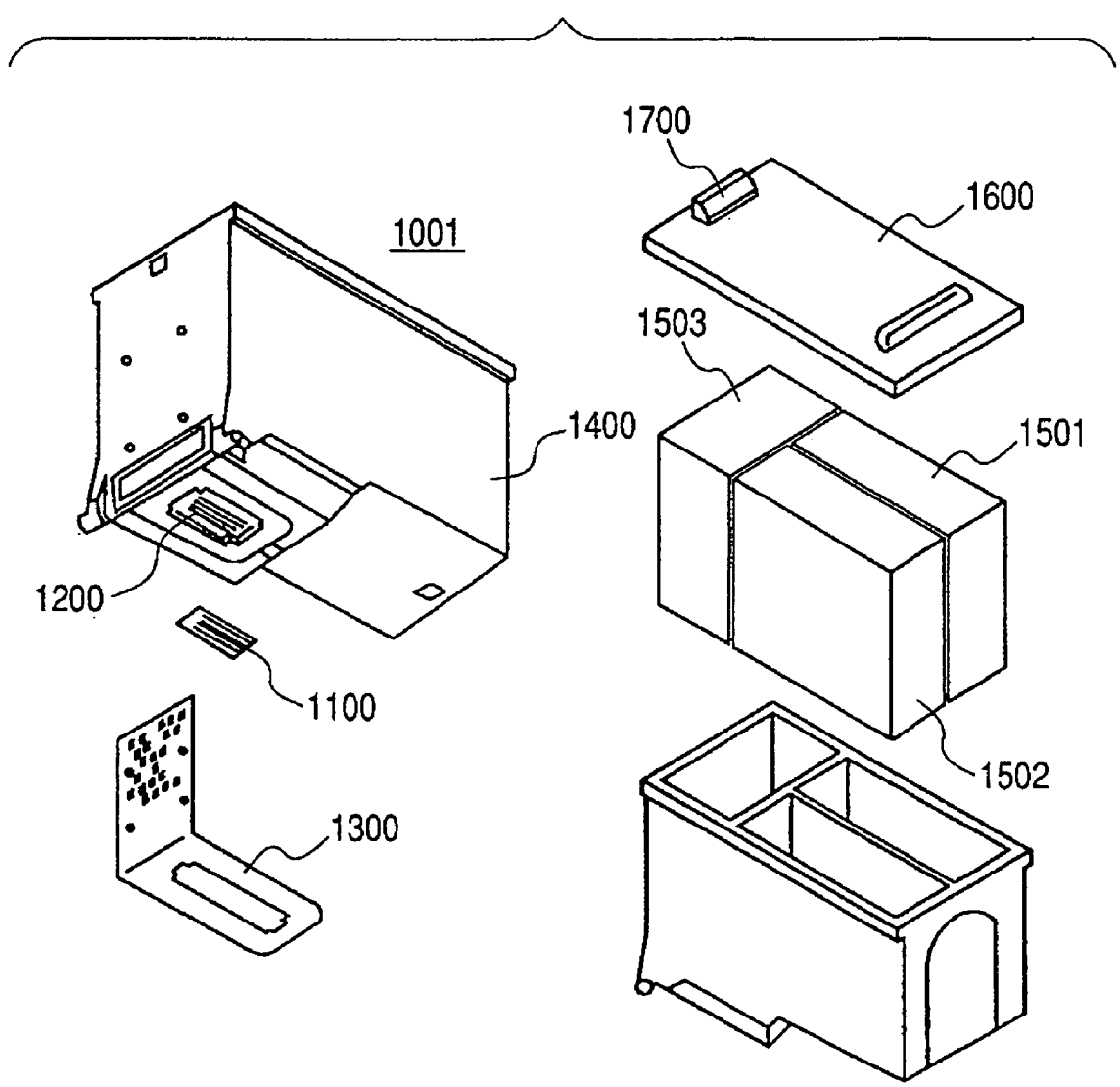
FIG. 9 is an exploded view of a recording head.

FIG. 9 is an exploded view of another recording head that can be used for the present invention. The recording head shown in FIG. 9 is integrated with an ink tank as in the case of FIG. 8. Multiple, inks different from each other in color (such as cyan, magenta, and yellow inks) can be mounted on a recording head 1001, and the recording head is replaced when mounted ink is consumed.

The recording head 1001, which is intended for the ejection of multiple inks different from each other in color (such as cyan, magenta, and yellow inks), includes a recording element substrate 1100 on which ink supply orifices for cyan, magenta, and yellow are formed in parallel. An ink supply/hold member 1400 has a space for independently holding absorbents 1501, 1502, and 1503 for generating negative pressures for holding cyan, magenta, and yellow inks in the absorbents to provide a function as an ink tank, and forms an independent ink flow path for introducing each ink to the ink supply orifices of the recording element substrate 1100 to provide an ink supply function.

Recording Unit

An example of a recording unit suitable for performing recording by means of the ink according to the present invention includes a recording unit including an ink storage portion for storing the ink and a recording head. In particular, a recording unit in which the recording head applies thermal energy corresponding to a recording signal to the ink to generate an ink droplet by virtue of the energy can be exemplified.

The recording head in the present invention has a heating portion liquid-contact surface containing a metal and/or a metal oxide. Specific examples of the metal and/or the metal oxide include metals such as Ta, Zr, Ti, Ni, and Al, and oxides of these metals.

<Ink Jet Recording Apparatus>

An example of a recording apparatus suitable for performing recording by means of the ink according to the present invention includes a recording apparatus in which thermal energy corresponding to a recording signal is applied to ink in the chamber of a recording head having an ink storage portion for storing the ink to generate an ink droplet by virtue of the energy.

Hereinafter, the schematic constitution of a mechanism portion of an ink jet recording apparatus will be described. A recording apparatus main body is constituted by a sheet feeding portion, a sheet conveying portion, a carriage portion, a sheet discharge portion, and a cleaning portion, and an external packaging portion for protecting them and providing them with design to achieve a role of each mechanism. Hereinafter, the outline of each of them will be described.

Figure 2:
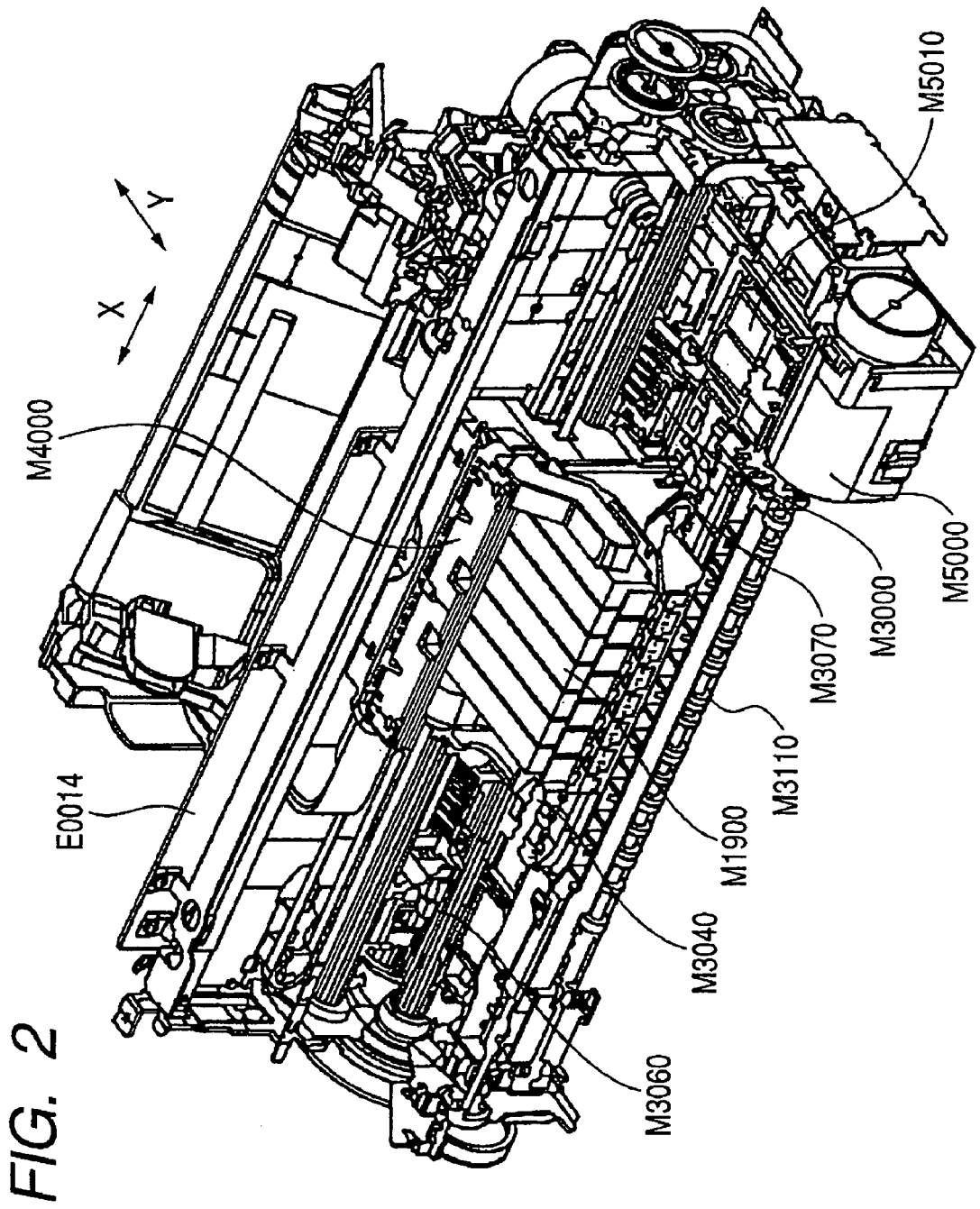
FIG. 2 is a perspective view of a mechanism portion of the recording apparatus.
Figure 3:
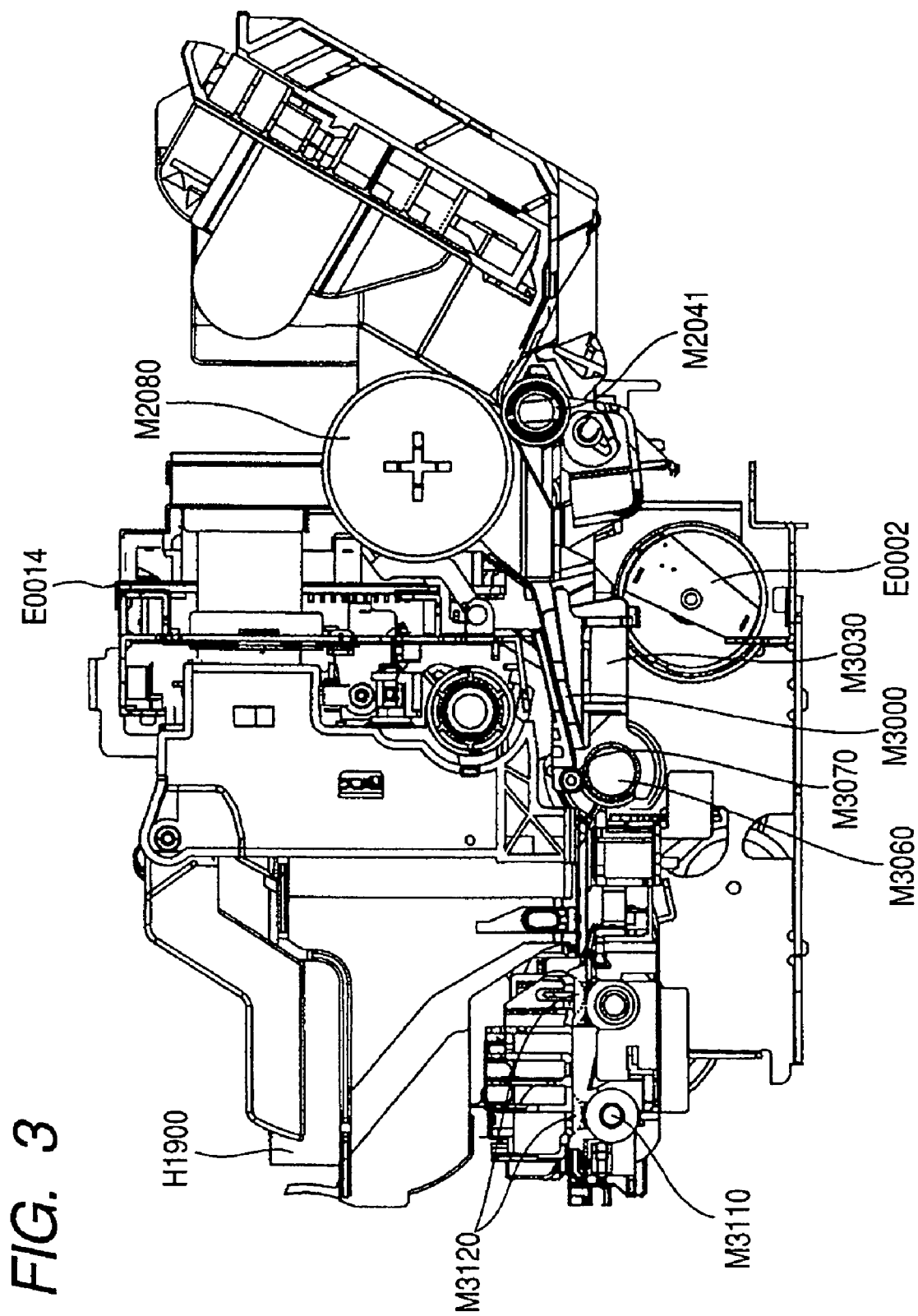
FIG. 3 is a sectional view of the recording apparatus.

FIG. 1 is a perspective view of a recording apparatus. FIGS. 2 and 3 are views for explaining the internal mechanism of a recording apparatus main body. FIG. 2 is a perspective view seen from an upper right portion, and FIG. 3 is a side sectional view of the recording apparatus main body.

When a sheet is to be fed in the recording apparatus, only a predetermined number of recording media are sent to a nip portion composed of a sheet feeding roller M2080 and a separating roller M2041 in the sheet feeding portion including a sheet feeding tray M2060. The sent recording media are separated at the nip portion, and only the uppermost recording medium is conveyed. The recording medium sent to the sheet conveying portion is guided by a pinch roller holder M3000 and a paper guide flapper M3030 to be sent to a roller pair composed of a conveying roller M3060 and a pinch roller M3070. The roller pair composed of the conveying roller M3060 and the pinch roller M3070 are rotated by the driving of an LF motor E0002, and the rotation causes the recording medium to be conveyed on a platen M3040.

In the carriage portion, when an image is to be formed on a recording medium, a recording head H1001 (FIG. 4) is arranged at a target image forming position, and ink is ejected to the recording medium in accordance with a signal from an electrical substrate E0014. Details about the constitution of the recording head H1001 will be described later. While recording is performed by the recording head H1001 recording main scanning in which a carriage M4000 scans in a column direction and sub scanning in which a recording medium is conveyed in a row direction by the conveying roller M3060 are alternately repeated, whereby an image is formed on the recording-medium.

Finally the recording medium on which an image has been formed is sandwiched at a nip between a first sheet discharge roller M3110 and a spur M3120 in the sheet discharge portion, conveyed, and discharged to a sheet discharge tray M3160.

In the cleaning portion, when a pump M5000 is allowed to act in a state where a cap M5010 is brought into close contact with an ink ejection orifice of the recording head H1001 for the purpose of cleaning the recording head H1001 before and after image recording, unnecessary ink and the like are sucked from the recording head H1001. The ink remaining in the cap M5010 is sucked with the cap M5010 opened, whereby neither sticking of the remaining ink nor a subsequent harmful effect occurs.

(Constitution of Recording Head)

The constitution of a head cartridge H1000 will be described. The head cartridge H1000 includes the recording head H1001, means for mounting ink tanks H1900, and means for supplying ink from the ink tanks H1900 to the recording head, and is detachably mounted on the carriage M4000.

Figure 4:
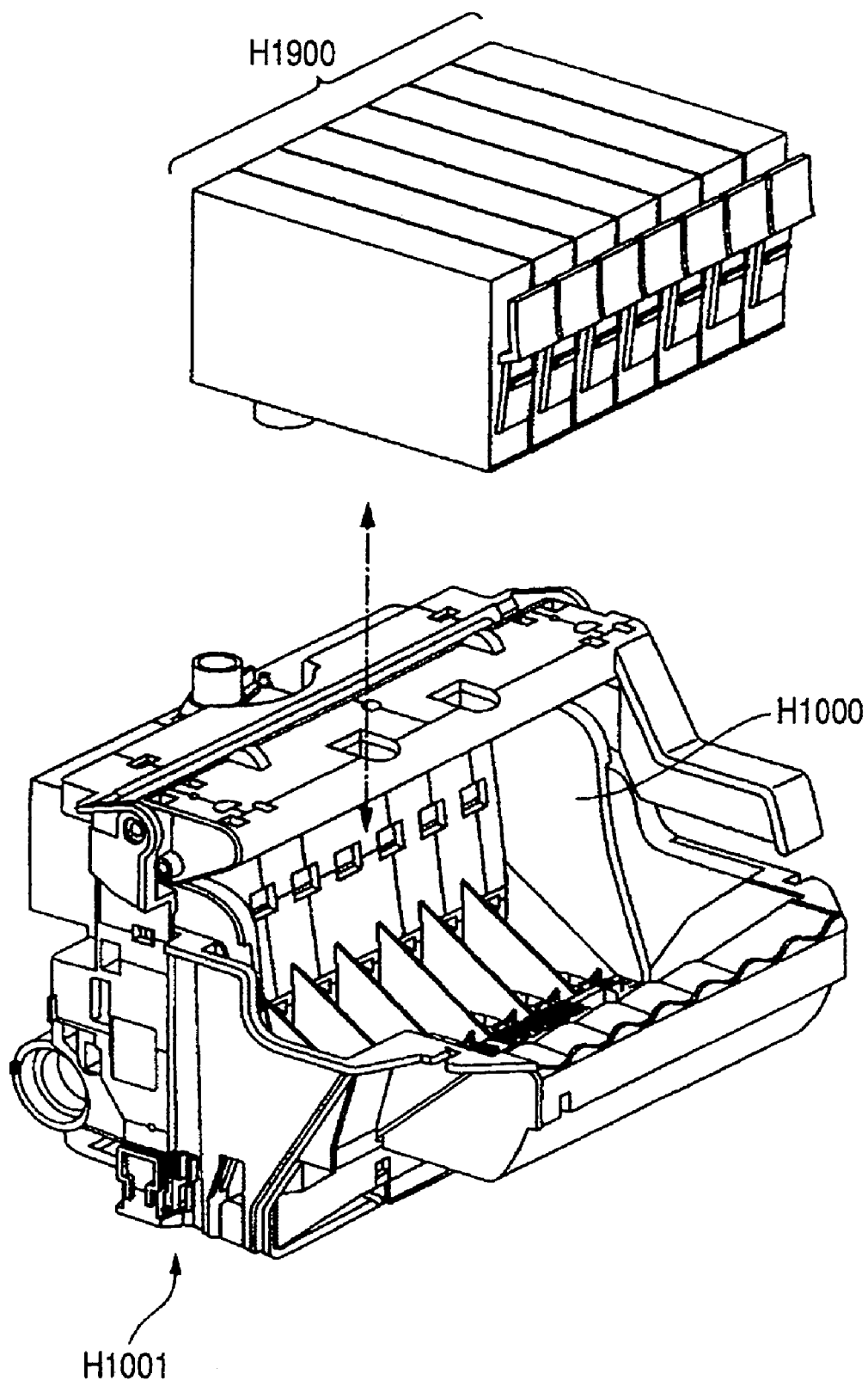
FIG. 4 is a perspective view showing a state where an ink tank is mounted on a head cartridge.

FIG. 4 shows how the ink tanks H1900 are mounted on the head cartridge H1000. The recording apparatus forms an image by means of yellow, magenta, cyan, black, pale magenta, pale cyan, and green inks, so the ink tanks H1900 are independently prepared for seven colors. The ink according to the present invention is used for at least one of the above inks. In addition, as shown in the figure, each ink tank is detachable to the head cartridge H1000. The ink tanks H1900 can be detached in a state where the head cartridge H1000 is mounted on the carriage M4000.

Figure 5:
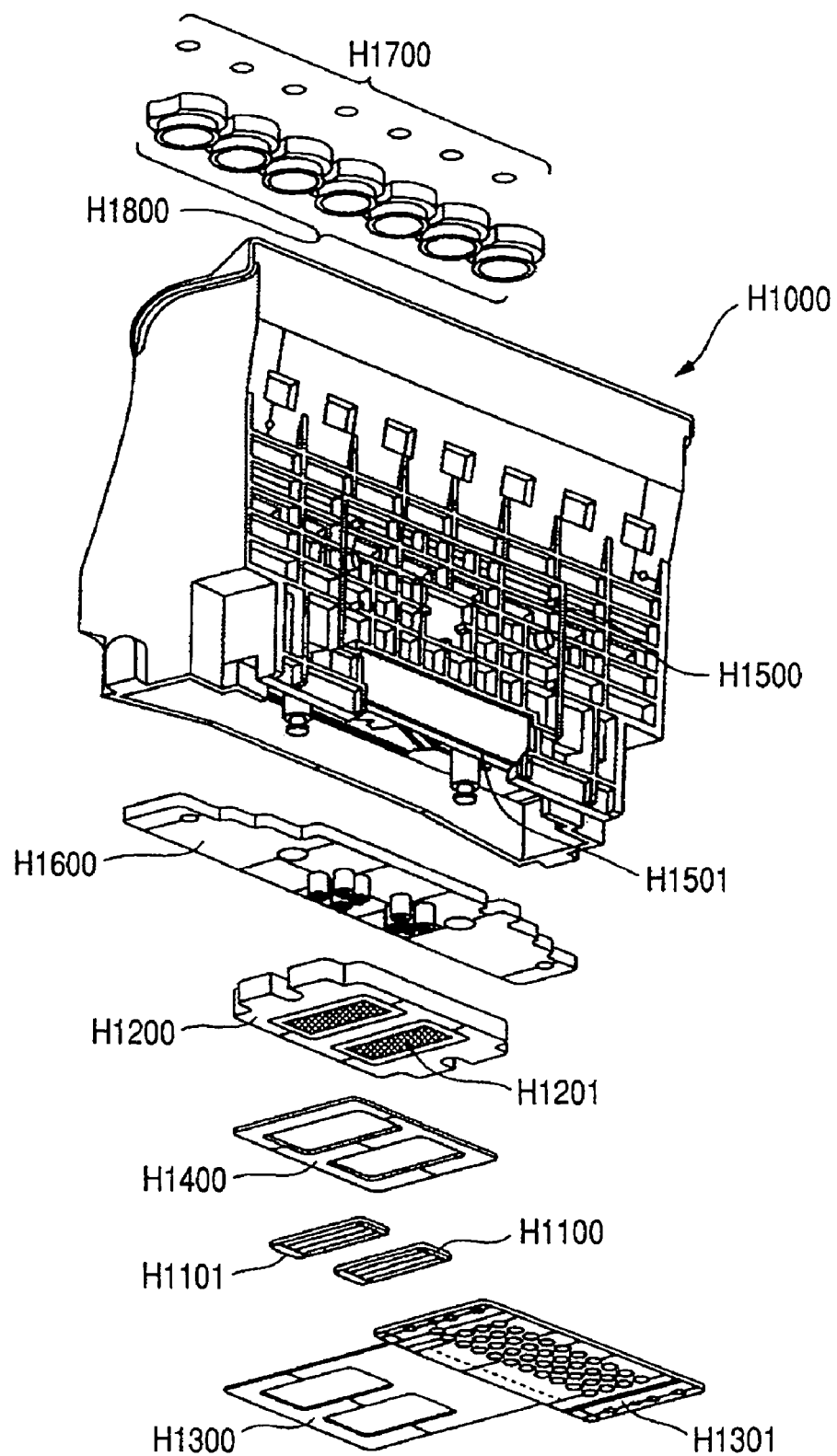
FIG. 5 is an exploded perspective view of the head cartridge.

FIG. 5 shows an exploded perspective view of the head cartridge H1000. In the figure, the head cartridge H1000 includes a first recording element substrate H1100, a second recording element substrate H1101, a first plate H1200, a second plate H1400, an electric wiring substrate H1300, a tank holder H1500, a flow path forming member H1600, a filter H1700, and a seal rubber H1800.

Each of the first recording element substrate H1100 and the second recording element substrate H1101 is an Si substrate having multiple recording elements (nozzles) for ejecting ink formed on one surface by means of photolithography. Electric wiring made of Al or the like for supplying power to each recording element is formed by means of a film formation technique, and multiple ink flow paths corresponding to the individual recording elements are also formed by means of photolithography. Furthermore, ink supply orifices for supplying ink to the multiple ink flow paths are formed so as to open on the rear surface.

Figure 6:
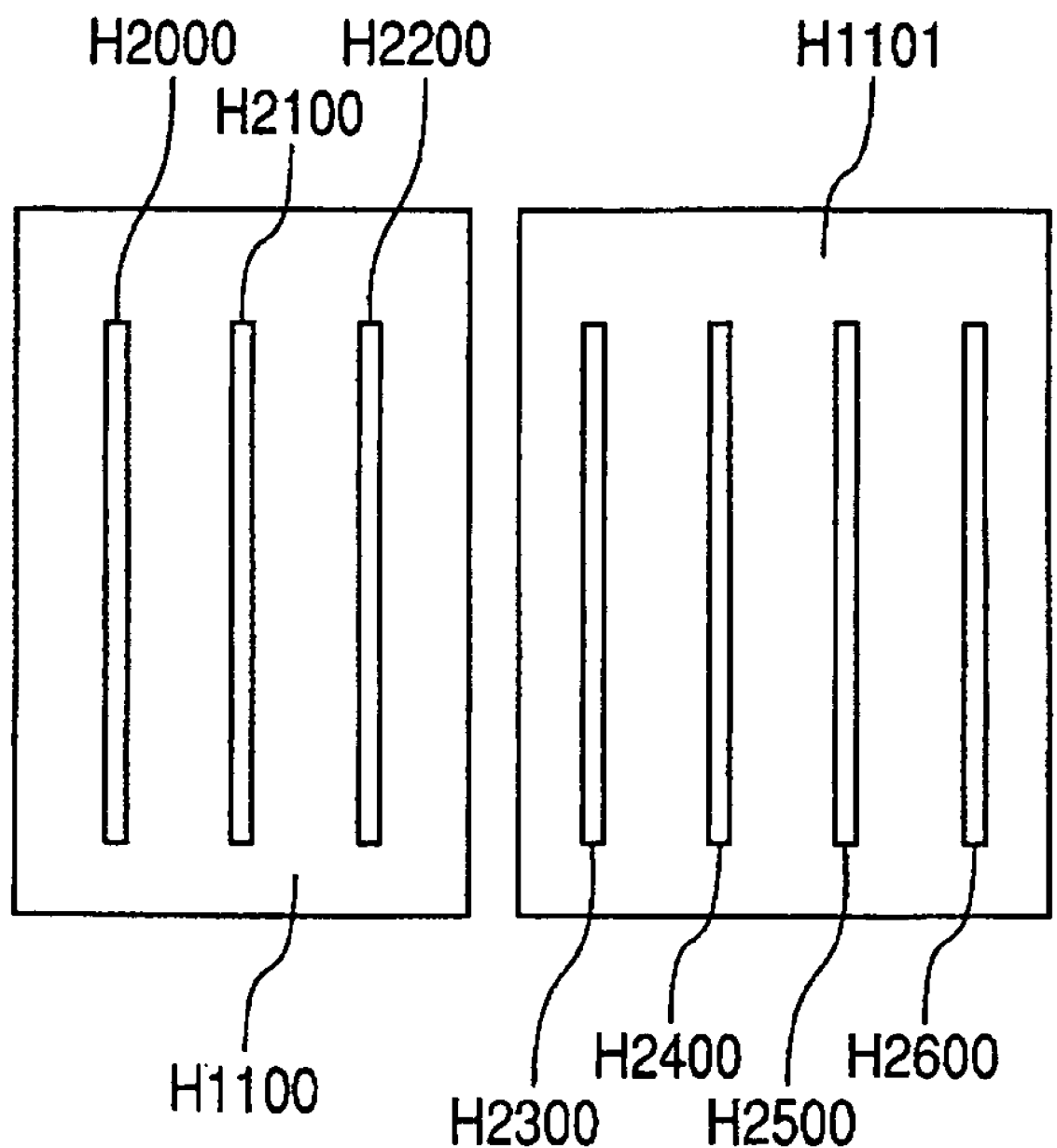
FIG. 6 is a front view showing a recording element substrate in the head cartridge.

FIG. 6 is an enlarged front view for explaining the constitution of each of the first recording element substrate H1100 and the second recording element substrate H1101. Reference symbols H2000 to H2600 denote recording element trains (which may hereinafter be also referred to as nozzle trains) corresponding to different ink colors. The first recording element substrate H1100 has nozzle trains for three colors: the nozzle train H2000 to which yellow ink is supplied, the nozzle train H2100 to which magenta ink is supplied, and the nozzle train H2200 to which cyan ink is supplied. The second recording element substrate H1101 has nozzle trains for four colors: the nozzle train H2300 to which pale cyan ink is supplied, the nozzle train H2400 to which black ink is supplied, the nozzle train H2500 to which orange ink is supplied, and the nozzle train H2600 to which pale magenta ink is supplied.

Each nozzle train is constituted by 768 nozzles arranged at an interval of 1,200 dpi (dot/inch reference value) in the direction in which a, recording medium is conveyed, and each nozzle ejects about 2 pl of ink droplet. An opening area in each. nozzle ejection orifice is set to about 100 $\mu m^2$. The first recording element substrate H1100 and the second recording element substrate H1101 are bonded and fixed to the first plate H1200 having ink supply orifices H1201 formed thereon for supplying ink to the first recording element substrate H1100 and the second recording element substrate H1101.

The second plate H1400 having openings is also bonded and fixed to the, first plate H1200. The second plate H1400 holds the electric wiring substrate H1300 in such a manner that the electric wiring substrate H1300, the first recording element substrate H1100, and the second recording element substrate H1101 are electrically connected.

The electric wiring substrate H1300 applies an electrical signal for causing each of the nozzles formed on the first recording element substrate H1100 and the second recording element substrate H1101 to eject ink. The electric wiring substrate H1300 has electric wiring corresponding to each of the first recording element substrate H1100 and the second recording element substrate H1101; and an external signal input terminal H1301 which is positioned at an end portion of the electric wiring to receive an electrical signal from the recording apparatus main body. The external signal input terminal H1301 is positioned and fixed to the back surface side of the tank holder H1500.

Meanwhile, the flow path forming member H1606 is fixed by means of, for example, ultrasonic welding to the tank holder H1500 for holding the ink tanks H1900. Thus, an ink flow path H1501 passing from the ink tanks H1900 to the first plate H1200 is formed.

The filter H1700 is arranged at an end portion on the ink tank side of the ink flow path H1501 engaged with the ink tanks. H1900, so the filter H1700 can prevent dust from entering from the outside. The seal rubber H1800 is mounted on the portion at which the ink flow path H1501 is engaged with the ink tanks H1900 to prevent ink from evaporating from the portion.

Furthermore, as described above, the head cartridge H1000 is constituted by connecting through bonding or the like a tank holder portion constituted by the tank holder H1500, the flow path form member H1600, the filter H1700, and the seal rubber H1800, and the recording head portion H1001 constituted by the first recording element substrate H1100, the second recording element substrate H1101, the first plate H1200, the electric wiring substrate H1300, and the second plate H1400.

Description has been made here by taking, as an example of an embodiment of a recording head, a recording head according to a Bubble Jet (registered trademark) system that performs recording by means of an electrothermal transducer (recording element) for generating thermal energy for causing ink to generate film boiling in accordance with an electrical signal.

The representative structure and principle of this system are preferably basic principles disclosed in, for example, descriptions of U.S. Pat. No. 4,723,129 and U.S. Pat. No. 4,740,796. The system is applicable to any one of so-called an on-demand type and a continuous type. In particular, the system is effective for the on-demand type because of the following reason. At least one driving signal which corresponds to recording information and causes a sudden increase in temperature exceeding nuclear boiling is applied to an electrothermal transducer arranged in correspondence with a sheet or liquid flow path holding a liquid (ink) to thereby cause the electrothermal transducer to generate thermal energy. Then, a thermal action surface of a recording head is caused to generate film boiling. As a result, an air bubble in the liquid (ink) can be formed so as to be in one-to-one correspondence with the driving signal. The growth and contraction of the air bubble cause the liquid (ink) to be ejected through an opening for ejection, thereby forming at least one droplet. The driving signal is more preferably of a pulse shape because the growth and contraction of an air bubble can be performed immediately and appropriately, and hence the liquid (ink) can be ejected with excellent responsiveness.

An example of a second embodiment of an ink jet recording apparatus utilizing mechanical energy includes an on-demand ink jet recording head including a nozzle forming substrate having multiple nozzles; pressure generating means arranged so as to be opposed to the nozzles and composed of a piezoelectric material and a conductive material; and ink filling the surroundings of the pressure generating means in which the pressure generating means is displaced by an applied voltage to eject a small ink droplet from a nozzle.

The ink jet recording apparatus is not limited to such apparatus as described above in which a head and an ink tank are separated, and may be one in which a head and an ink tank are integrated so that they are unseparable. The ink tank may be separably or unseparably integrated with the head to be mounted on a carriage, or may be mounted at a fixing portion of an apparatus to supply ink to a recording head through an ink supply member such as a tube. When the ink tank is provided with a constitution for applying a preferable negative pressure to the recording head, an absorbent may be arranged in an ink storage portion of the ink tank, or the ink tank may have a flexible ink storage bag and a spring portion for applying bias to expand the internal volume of the bag. The recording apparatus may use a serial recording system as described above, or may be in the form of a line printer obtained by aligning recording elements over the range corresponding to the entire width of a recording medium.

EXAMPLES

Hereinafter, the present invention will be described in more detail by way of examples and comparative examples. However, the present invention is not limited to the following examples without departing from the gist of the present invention. Unless otherwise stated, the term "part" of each ink component in examples and comparative examples represents "part by mass".

[Ink Set]

The respective components shown in each of Tables 2 to 6 below were mixed and sufficiently stirred. After that, the resultant was filtered through a filter having a pore size of 0.2 μm under pressure to prepare each of ink sets 1 to 5.

The viscosity of each ink constituting each ink set was measured. As a result, each ink constituting each of the ink sets 1 to 3 had a viscosity of 2 to 3 mPa·s, each ink constituting the ink set 4 had a viscosity of 3 mPa·s, and each ink constituting the ink set 5 had a viscosity of 4 mPa·s.

TABLE 2

Ink set 1

| | Molecular weight | Cyan | Magenta | Yellow | Black | Photo-cyan | Photo-magenta |
|---|---|---|---|---|---|---|---|
| Glycerin | 92 | 7.0 | 7.0 | 10.0 | 10.0 | 10.0 | 10.0 |
| Ethylene glycol | 62 | 10.0 | 10.0 | 8.0 | 8.0 | 8.0 | 8.0 |
| Diethylene glycol | 106 | 0.0 | 0.0 | 0.0 | 0.0 | 0.0 | 0.0 |
| Urea | 60 | 10.0 | 10.0 | 0.0 | 10.0 | 0.0 | 0.0 |
| 2-pyrrolidone | 85 | 5.0 | 5.0 | 7.0 | 5.0 | 7.0 | 7.0 |
| Ethylene urea | 86 | 0.0 | 0.0 | 2.0 | 0.0 | 2.0 | 2.0 |
| 1,5-pentanediol | 104 | 0.0 | 0.0 | 3.0 | 0.0 | 3.0 | 3.0 |
| Acetylenol E100 | (*) | 1.0 | 1.0 | 1.0 | 1.0 | 1.0 | 1.0 |
| C.I. Direct Blue 199 (sodium salt) | (**) | 5.0 | | | | 1.2 | |
| Compound (I) below (lithium salt) | (**) | | 5.0 | | | | 1.2 |
| C.I. Direct Yellow 142 | (**) | | | 3.0 | | | |
| C.I. Food Black 2 (sodium salt) | (**) | | | | 5.0 | | |
| Water | 18 | 62.0 | 62.0 | 66.0 | 61.0 | 67.8 | 67.8 |
| Number of moles of water-soluble compound | — | 0.463 | 0.463 | 0.372 | 0.463 | 0.372 | 0.372 |
| Number of moles of water | — | 3.44 | 3.44 | 3.67 | 3.39 | 3.77 | 3.77 |
| Molar fraction [%] of water | — | 88.2 | 88.2 | 90.8 | 88.0 | 91.0 | 91.0 |

(*) Ethylene oxide adduct of acetylene glycol (surfactant; manufactured by Kawaken Fine Chemicals Co., Ltd.) This compound is not taken into consideration in calculating the number of moles of the water-soluble compound because it has a molecular weight of 643.
(**) Each coloring material has a molecular weight in excess of 300.

TABLE 3

Ink set 2

| | Molecular weight | Cyan | Magenta | Yellow | Black | Photo-cyan | Photo-magenta |
|---|---|---|---|---|---|---|---|
| Glycerin | 92 | 7.0 | 7.0 | 9.0 | 10.0 | 9.0 | 9.0 |
| Ethylene glycol | 62 | 10.0 | 10.0 | 10.0 | 8.0 | 10.0 | 10.0 |

TABLE 3-continued

Ink set 2

| | Molecular weight | Cyan | Magenta | Yellow | Black | Photo-cyan | Photo-magenta |
|---|---|---|---|---|---|---|---|
| Diethylene glycol | 106 | 0.0 | 0.0 | 0.0 | 0.0 | 0.0 | 0.0 |
| Urea | 60 | 10.0 | 10.0 | 0.0 | 10.0 | 0.0 | 0.0 |
| 2-pyrrolidone | 85 | 5.0 | 5.0 | 5.0 | 5.0 | 5.0 | 5.0 |
| Ethylene urea | 86 | 0.0 | 0.0 | 0.0 | 0.0 | 0.0 | 0.0 |
| 1,5-pentanediol | 104 | 0.0 | 0.0 | 0.0 | 0.0 | 0.0 | 0.0 |
| Acetylenol E100 | (*) | 1.0 | 1.0 | 1.0 | 1.0 | 1.0 | 1.0 |
| C.I. Direct Blue 199 (sodium salt) | (**) | 5.0 | | | | 1.2 | |
| Compound (I) below (lithium salt) | (**) | | 5.0 | | | | 1.2 |
| C.I. Direct Yellow 142 | (**) | | | 3.0 | | | |
| C.I. Food Black 2 (sodium salt) | (**) | | | | 5.0 | | |
| Water | 18 | 62.0 | 62.0 | 72.0 | 61.0 | 73.8 | 73.8 |
| Number of moles of water-soluble compound | — | 0.463 | 0.463 | 0.318 | 0.463 | 0.318 | 0.318 |
| Number of moles of water | — | 3.44 | 3.44 | 4.00 | 3.39 | 4.10 | 4.10 |
| Molar fraction [%] of water | — | 88.2 | 88.2 | 92.6 | 88.0 | 92.8 | 92.8 |

(*) Ethylene oxide adduct of acetylene glycol (surfactant; manufactured by Kawaken Fine Chemicals Co., Ltd.) This compound is not taken into consideration in calculating the number of moles of the water-soluble compound because it has a molecular weight of 643.
(**) Each coloring material has a molecular weight in excess of 300.

TABLE 4

Ink set 3

| | Molecular weight | Cyan | Magenta | Yellow | Black | Photo-cyan | Photo-magenta |
|---|---|---|---|---|---|---|---|
| Glycerin | 92 | 7.0 | 7.0 | 10.0 | 10.0 | 10.0 | 10.0 |
| Ethylene glycol | 62 | 10.0 | 10.0 | 5.0 | 8.0 | 5.0 | 5.0 |
| Diethylene glycol | 106 | 0.0 | 0.0 | 0.0 | 0.0 | 0.0 | 0.0 |
| Urea | 60 | 10.0 | 10.0 | 0.0 | 10.0 | 0.0 | 0.0 |
| 2-pyrrolidone | 85 | 5.0 | 5.0 | 6.0 | 5.0 | 6.0 | 6.0 |
| Ethylene urea | 86 | 0.0 | 0.0 | 0.0 | 0.0 | 0.0 | 0.0 |
| 1,5-pentanediol | 104 | 0.0 | 0.0 | 0.0 | 0.0 | 0.0 | 0.0 |
| Acetylenol E100 | (*) | 1.0 | 1.0 | 1.0 | 1.0 | 1.0 | 1.0 |
| C.I. Direct Blue 199 (sodium salt) | (**) | 5.0 | | | | 1.2 | |
| Compound (I) below (lithium salt) | (**) | | 5.0 | | | | 1.2 |
| C.I. Direct Yellow 142 | (**) | | | 3.0 | | | |
| C.I. Food Black 2 (sodium salt) | (**) | | | | 5.0 | | |
| Water | 18 | 62.0 | 62.0 | 75.0 | 61.0 | 76.8 | 76.8 |
| Number of moles of water-soluble compound | — | 0.463 | 0.463 | 0.260 | 0.463 | 0.260 | 0.260 |
| Number of moles of water | — | 3.44 | 3.44 | 4.17 | 3.39 | 4.27 | 4.27 |
| Molar fraction [%] of water | — | 88.2 | 88.2 | 94.1 | 88.0 | 94.3 | 94.3 |

(*) Ethylene oxide adduct of acetylene glycol (surfactant; manufactured by Kawaken Fine Chemicals Co., Ltd.) This compound is not taken into consideration in calculating the number of moles of the water-soluble compound because it has a molecular weight of 643.
(**) Each coloring material has a molecular weight in excess of 300.

TABLE 5

Ink set 4

| | Molecular weight | Cyan | Magenta | Yellow | Black | Photo-cyan | Photo-magenta |
|---|---|---|---|---|---|---|---|
| Glycerin | 92 | 7.7 | 7.7 | 11.0 | 11.0 | 11.0 | 11.0 |
| Ethylene glycol | 62 | 11.0 | 11.0 | 8.8 | 8.8 | 8.8 | 8.8 |
| Diethylene glycol | 106 | 0.0 | 0.0 | 0.0 | 0.0 | 0.0 | 0.0 |
| Urea | 60 | 11.0 | 11.0 | 0.0 | 0.0 | 0.0 | 0.0 |
| 2-pyrrolidone | 85 | 5.5 | 5.5 | 7.7 | 5.5 | 7.7 | 7.7 |

TABLE 5-continued

Ink set 4

| | Molecular weight | Cyan | Magenta | Yellow | Black | Photo-cyan | Photo-magenta |
|---|---|---|---|---|---|---|---|
| Ethylene urea | 86 | 0.0 | 0.0 | 2.2 | 11.0 | 2.2 | 2.2 |
| 1,5-pentanediol | 104 | 0.0 | 0.0 | 3.3 | 0.0 | 3.3 | 3.3 |
| Acetylenol E100 | (*) | 1.1 | 1.1 | 1.1 | 1.1 | 1.1 | 1.1 |
| C.I. Direct Blue 199 (sodium salt) | (**) | 5.5 | | | | 1.3 | |
| Compound (I) below (lithium salt) | (**) | | 5.5 | | | | 1.3 |
| C.I. Direct Yellow 142 | (**) | | | 3.3 | | | |
| C.I. Food Black 2 (sodium salt) | (**) | | | | 5.5 | | |
| Water | 18 | 58.2 | 58.2 | 62.6 | 57.1 | 64.6 | 64.6 |
| Number of moles of water-soluble compound | — | 0.509 | 0.509 | 0.409 | 0.454 | 0.409 | 0.409 |
| Number of moles of water | — | 3.23 | 3.23 | 3.48 | 3.17 | 3.59 | 3.59 |
| Molar fraction [%] of water | — | 86.4 | 86.4 | 89.5 | 87.5 | 89.8 | 89.8 |

(*) Ethylene oxide adduct of acetylene glycol (surfactant; manufactured by Kawaken Fine Chemicals Co., Ltd.) This compound is not taken into consideration in calculating the number of moles of the water-soluble compound because it has a molecular weight of 643.
(**) Each coloring material has a molecular weight in excess of 300.

TABLE 6

Ink set 5

| | Molecular weight | Cyan | Magenta | Yellow | Black | Photo-cyan | Photo-magenta |
|---|---|---|---|---|---|---|---|
| Glycerin | 92 | 8.8 | 8.8 | 12.5 | 12.5 | 12.5 | 12.5 |
| Ethylene glycol | 62 | 12.5 | 12.5 | 11.0 | 10.0 | 11.0 | 11.0 |
| Diethylene glycol | 106 | 0.0 | 0.0 | 0.0 | 0.0 | 0.0 | 0.0 |
| Urea | 60 | 12.5 | 12.5 | 0.0 | 12.5 | 0.0 | 0.0 |
| 2-pyrrolidone | 85 | 6.3 | 6.3 | 8.8 | 6.3 | 8.8 | 8.8 |
| Ethylene urea | 86 | 0.0 | 0.0 | 2.5 | 0.0 | 2.5 | 2.5 |
| 1,5-pentanediol | 104 | 0.0 | 0.0 | 3.8 | 0.0 | 3.8 | 3.8 |
| Acetylenol E100 | (*) | 1.3 | 1.3 | 1.3 | 1.3 | 1.3 | 1.3 |
| C.I. Direct Blue 199 (sodium salt) | (**) | 6.3 | | | | 1.5 | |
| Compound (I) below (lithium salt) | (**) | | 6.3 | | | | 1.5 |
| C.I. Direct Yellow 142 | (**) | | | 3.8 | | | |
| C.I. Food Black 2 (sodium salt) | (**) | | | | 6.3 | | |
| Water | 18 | 52.3 | 52.3 | 56.3 | 51.1 | 58.6 | 58.6 |
| Number of moles of water-soluble compound | — | 0.580 | 0.580 | 0.482 | 0.580 | 0.482 | 0.482 |
| Number of moles of water | — | 2.91 | 2.91 | 3.13 | 2.84 | 3.26 | 3.26 |
| Molar fraction [%] of water | — | 83.4 | 83.4 | 86.6 | 83.0 | 87.1 | 87.1 |

(*) Ethylene oxide adduct of acetylene glycol (surfactant; manufactured by Kawaken Fine Chemicals Co., Ltd.) This compound is not taken into consideration in calculating the number of moles of the water-soluble compound because it has a molecular weight of 643.
(**) Each coloring material has a molecular weight in excess of 300.

Compound (I)

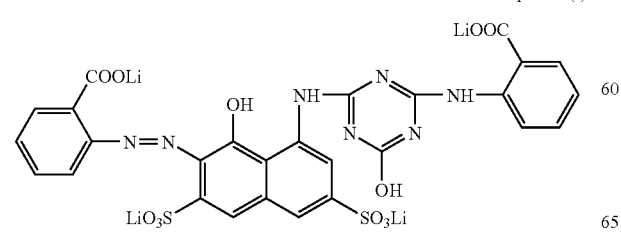

Example 1

The cyan ink of the ink set 1 was used in combination with yellow ink, and the yellow ink was provided as an ink of Example 1.

Example 2

The photocyan ink of the ink set 1 was used in combination with black ink, and the black ink was provided as an ink of Example 2.

Example 3

The cyan ink of the ink set 2 was used in combination with yellow ink, and the yellow ink was provided as an ink of Example 3.

Example 4

The photocyan ink of the ink set 2 was used in combination with black ink, and the black ink was provided as an ink of Example 4.

Example 5

The cyan ink of the ink set 4 was used in combination with yellow ink, and the yellow ink was provided as an ink of Example 5.

Example 6

The photocyan ink of the ink set 4 was used in combination with black ink, and the black ink was provided as an ink of Example 6.

Example 7

The cyan ink of the ink set 5 was used in combination with yellow ink, and the yellow ink was provided as an ink of Example 7.

Example 8

The photocyan ink of the ink set 5 was used in combination with black ink, and the black ink was provided as an ink of Example 8.

Example 9

The respective inks of the ink set 1 were used simultaneously. Photocyan ink having a maximum molar fraction of water out of the respective inks was provided as a first ink in the present invention, and cyan ink to be used in combination with the first ink was provided as an ink of Example 9.

Example 10

The respective inks of the ink set 2 were used simultaneously. Photocyan ink having a maximum molar fraction of water out of the respective inks was provided as a first ink in the present invention, and cyan ink to be used in combination with the first ink was provided as an ink of Example 10.

Example 11

The respective inks of the ink set 4 were used simultaneously. Photocyan ink having a maximum molar fraction of water out of the respective inks was provided as a first ink in the present invention, and cyan ink to be used in combination with the first ink was provided as an ink of Example 11.

Example 12

The respective inks of the ink set 5 were used simultaneously. Photocyan ink having a maximum molar fraction of water out of the respective inks was provided as a first ink in the present invention, and cyan ink to be used in combination with the first ink was provided as an ink of Example 12.

Comparative Example 1

The cyan ink of the ink set 3 was used in combination with yellow ink, and the yellow ink was provided as an ink of Comparative Example 1.

Comparative Example 2

The photocyan ink of the ink set 3 was used in combination with black ink, and the black ink was provided as an ink of Comparative Example 2.

Comparative Example 3

The respective inks of the ink set 3 were used simultaneously. Photocyan ink having a maximum molar fraction of water out of the respective inks was provided as a first ink in the present invention, and cyan ink to be used in combination with the first ink was provided as an ink of Comparative Example 3.

[Evaluation of Ink]

Each ink was charged into an ink cartridge. Then, the ink cartridge was mounted on an ink jet recording apparatus, and the whole was left under predetermined conditions. After that, printing was started again to evaluate image performance recovery property. To be specific, each ink was charged into an ink cartridge for an on demand ink jet recording apparatus (trade name: PIXUS 950 i; manufactured by CANON Inc.) using a heater element as a source of energy for ink ejection. Then, the ink cartridge was mounted on the ink jet recording apparatus, and the whole was left for 72 hours in an environment having a temperature of 30° C. and a humidity of 10% while a recording head was capped. After that, a solid pattern having a size equivalent to the entire nozzle width of the recording head was printed on the entire surface of A4-size professional photopaper (PR-101; manufactured by CANON Inc.) at a duty of 50% without any purging recovery operation, and the resultant image was evaluated. The evaluation criteria are as follows. Table 7 shows the results of the evaluation.

In each of Examples 1 to 8 and Comparative Examples 1 and 2, only the first ink and the second ink were used, so an unused ejection orifice of the recording head was filled with a water-insoluble resin.

(Evaluation Criteria)

A: None of the colors shows color-unevenness over the entire region.

B: Some colors show concentrated and pale portions in portion's printed at an early stage.

C: There is a color that becomes concentrated or pale over the range of several lines from the start of printing.

TABLE 7

|  |  | First Ink | Second Ink | Number of inks to be used in combination with second ink | Difference in molar fraction of water between first ink and second ink | Viscosity [mPa·s] | Presence or absence of water-soluble compound having a molecular weight of 70 or less | Results of evaluation |
|---|---|---|---|---|---|---|---|---|
| Example | 1 | Cyan | Yellow | 1 | 3 | 2 | Present | A |
|  | 2 | Photo-cyan | Black | 1 | 3 | 2 | Present | A |
|  | 3 | Cyan | Yellow | 1 | 4 | 2 | Present | B |
|  | 4 | Photo-cyan | Black | 1 | 5 | 2 | Present | B |
|  | 5 | Cyan | Yellow | 1 | 3 | 3 | Present | A |
|  | 6 | Photo-cyan | Black | 1 | 2 | 3 | Absent | B |
|  | 7 | Cyan | Yellow | 1 | 3 | 4 | Present | B |
|  | 8 | Photo-cyan | Black | 1 | 4 | 4 | Present | B |
|  | 9 | Photo-cyan | Cyan | 5 | 3 | 2 | Present | A |
|  | 10 | Photo-cyan | Cyan | 5 | 5 | 2 | Present | B |
|  | 11 | Photo-cyan | Cyan | 5 | 3 | 3 | Present | A |
|  | 12 | Photo-cyan | Cyan | 5 | 4 | 4 | Present | B |
| Comparative Example | 1 | Cyan | Yellow | 1 | 6 | 2 | Present | C |
|  | 2 | Photo-cyan | Black | 1 | 6 | 2 | Present | C |
|  | 3 | Photo-cyan | Cyan | 5 | 6 | 2 | Present | C |

Comparison between any one of Examples 1 to 4 and one of Comparative Examples 1 and 2 shows that the case where the difference in molar fraction of water between the first ink and the second ink is 5 or less is superior in recovery property to the case where the difference in molar fraction of water between them is 6 or more. As can be seen from each of Examples 1 to 4, recovery property (reliability) is particularly excellent in the case where the difference in molar fraction of water between the first ink and the second ink is 3 or less. Comparison between one of Examples 9 and 10 and Comparative Example 3 shows that the case where the difference in molar fraction of water between the first ink and the second ink is 5 or less is superior in recovery property to the case where the difference in molar fraction of water between them is 6 or more even when each of the first ink and the second is used in combination with three or more kinds of inks. It is also found that recovery property is additionally improved in the case where the difference in molar fraction of water between the first ink and the second ink is 3 or less. As can be seen from each of Examples 1, 2, 5, 7, and 8 reliability is additionally improved in the case where the second ink and the ink to be used in combination therewith each have a viscosity of 3 mPa·s or less. As can be seen from each of Examples 5 and 6, reliability is additionally improved in the case where ink contains a water-soluble compound having a molecular weight of 70 or less.

This application claims priorities from Japanese Patent Application Nos. 2004-228231 filed on Aug. 4, 2004 and 2005-224241 filed on Aug. 2, 2005, which are incorporated hereinto by reference.

What is claimed is:

1. A second ink to be used in combination with a first ink for use in an ink jet recording apparatus having a first opening to which the first ink is supplied, a second opening to which the second ink is supplied, and a cover member with which the first opening and the second opening are covered to form a closed space, the first ink comprising at least water, a water-soluble compound, and a coloring material, and the second ink comprising at least water, a water-soluble compound, and a coloring material, the first ink having a molar fraction of water of N (%) to a water-soluble compound having a molecular weight of 300 or less, in which the second ink has a molar fraction of water that is different from N (%) and is N−5 (%) or more and N+5 (%) or less, and at least one of the first ink and the second ink comprising, as the water-soluble compound, a water-soluble compound having a molecular weight of 70 or less.

2. An ink according to claim 1, wherein the molar fraction of water of the second ink is different from N (%) and is N−3 (%) or more and N+3 (%) or less.

3. An ink according to claim 1, wherein each of the first ink and the second ink has a viscosity of 3 mPa·s or less.

4. A second ink to be used in combination with a first ink out of multiple inks for use in an ink jet recording apparatus having multiple openings to each of which each of at least three kinds of the multiple inks is supplied and a cover member with which the multiple openings are covered to form a closed space, the first ink comprising at least water, a water-soluble compound, and a coloring material, and the second ink comprising at least water, a water-soluble compound, and a coloring material, the first ink having a maximum molar fraction N (%) of water to a water-soluble compound having a molecular weight of 300 or less, in which the second ink has a molar fraction of water that is N−5 (%) or more and less than N (%), and at least one of the first ink and the second ink comprising, as the water-soluble compound, a water-soluble compound having a molecular weight of 70 or less.

5. An ink according to claim 4, wherein the molar fraction of water of the second ink is N−3 (%) or more and less than N (%).

6. An ink according to claim 4, wherein each of the multiple inks has a viscosity of 3 mPa·s or less.

7. An ink for an ink set for use in an ink jet recording apparatus having a first opening to which a first ink is supplied, a second opening to which a second ink is supplied, and a cover member with which the first opening and the second opening are covered to form a closed space, in which each ink constituting the ink set comprising at least water, a water-soluble compound, and a coloring material, a difference in molar fraction (%) of water to a water-soluble compound having a molecular weight of 300 or less between any two of inks constituting the ink set is more than 0% and 5% or less, and at least one of the inks constituting the ink set comprising, as the water-soluble compound, a water-soluble compound having a molecular weight of 70 or less.

8. An ink according to claim 7, wherein the difference in molar fraction (%) of water is more than 0% and 3% or less.

9. An ink for an ink set for use in an ink jet recording apparatus having multiple openings to each of which each of at least three kinds of multiple inks is supplied and a cover member with which the multiple openings are covered to form a closed space, in which
  each ink constituting the ink set comprising at least water, a water-soluble compound, and a coloring material,
  a difference between a maximum and minimum molar fractions (%) of water to a water-soluble compound having a molecular weight of 300 or less in respective inks constituting the ink set out of the multiple inks to be supplied to the multiple openings covered with the cover member is more than 0% and 5% or less, and
  at least one of the inks constituting the ink set comprising, as the water-soluble compound, a water-soluble compound having a molecular weight of 70 or less.

10. An ink according to claim 9, wherein the difference between the maximum and minimum molar fractions N (%) of water to the water-soluble compound having a molecular weight of 300 or less in the multiple inks is more than 0% and 3% or less.

11. An ink according to claim 1, wherein each of the inks constituting the ink set has a viscosity of 3 mPa·s or less.

12. An ink according to claim 1, wherein:
  each of the water-soluble compounds having a molecular weight of 300 or less has a content (mass %) of 1 mass % or more with respect to a total mass of ink; and
  at least one of the water-soluble compounds having a molecular weight of 300 or less has a content (mass %) of 5 mass % or more with respect to a total mass of ink.

13. An ink according to claim 1, wherein the cover member comprises an ink jet purging cap.

14. An ink for an ink set constituted by at least two kinds of ink one of which comprises a water-soluble compound X which is not present in the other ink, in which
  each ink constituting the ink set comprising at least water, a water-soluble compound, and a coloring material,
  a difference between a maximum and minimum amounts of evaporation (mass %) of water is 3% or less when all inks constituting the ink set are left in an environment having a relative humidity of 80%, and
  at least one of the inks constituting the ink set comprising, as the water-soluble compound, a water-soluble compound having a molecular weight of 70 or less.

15. An ink according to claim 1, which is for use in ink jet.

16. An ink set for use in an ink jet recording apparatus having a first opening to which a first ink is supplied, a second opening to which a second ink is supplied, and a cover member with which the first opening and the second opening are covered to form a closed space, the ink set comprising at least the first ink and the second ink, in which
  the first ink comprising at least water, a water-soluble compound, and a coloring material, and the second ink comprising at least water, a water-soluble compound, and a coloring material,
  the first ink has a molar fraction of water of N (%) to a water-soluble compound having a molecular weight of 300 or less; and the second ink has a molar fraction of water to the water-soluble compound having a molecular weight of 300 or less that is different from N (%) and is N−5 (%) or more and N+5 (%) or less, and
  at least one of the first ink and the second ink comprising, as the water-soluble compound, a water-soluble compound having a molecular weight of 70 or less.

17. An ink set composed of multiple inks, comprising the ink according to claim 1.

18. An ink jet recording method, comprising ejecting an ink by an ink jet method, wherein the ink comprises the ink according to claim 1.

19. An ink cartridge, comprising an ink storage portion for storing an ink, wherein the ink comprises the ink according to claim 1.

20. A recording unit, comprising an ink storage portion for storing an ink and a recording head for ejecting the ink, wherein the ink comprises the ink according to claim 1.

21. An ink jet recording apparatus, comprising an ink storage portion for storing an ink and a recording head for ejecting the ink, wherein the ink comprises the ink according to claim 1.

22. An ink according to claim 1, wherein the water-soluble compound having a molecular weight of 70 or less is at least one selected from the group consisting of methyl alcohol, ethyl alcohol, n-propyl alcohol, isopropyl alcohol, acetone, ethylene glycol, and urea.

23. An ink according to claim 1, wherein the water-soluble compound having a molecular weight of 70 or less is at least one of ethylene glycol and urea.

24. An ink set according to claim 16, wherein the water-soluble compound having a molecular weight of 70 or less is at least one selected from the group consisting of methyl alcohol, ethyl alcohol, n-propyl alcohol, isopropyl alcohol, acetone, ethylene glycol, and urea.

25. An ink set according to claim 16, wherein the water-soluble compound having a molecular weight of 70 or less is at least one of ethylene glycol and urea.

* * * * *

UNITED STATES PATENT AND TRADEMARK OFFICE
CERTIFICATE OF CORRECTION

PATENT NO. : 7,247,193 B2
APPLICATION NO. : 11/342713
DATED : July 24, 2007
INVENTOR(S) : Shin-ichi Sato It is certified that error appears in the above-identified patent and that said Letters Patent is hereby corrected as shown below:

COLUMN 1

Line 53, "needs" should read --need--.

COLUMN 5

Line 5, "molar-fraction" should read --molar fraction--.

COLUMN 7

Line 7, "invention" should read --invention,--.

Line 38, "to be, taken" should read --to be taken--.

COLUMN 12

Line 27, "darboxyl" should read --carboxyl--.

COLUMN 23

Line 53, "needs" should read --need--.

COLUMN 24

Line 49, "glycol s" should read --glycols--.

Line 50, "ethylenelglycol" should read --ethylene glycol--.

Line 51, "triethylene-glycol" should read --triethylene glycol--.

Line 63, "(ion-exchanged)is" should read --(ion-exchanged) is--.

UNITED STATES PATENT AND TRADEMARK OFFICE
CERTIFICATE OF CORRECTION

PATENT NO. : 7,247,193 B2
APPLICATION NO. : 11/342713
DATED : July 24, 2007
INVENTOR(S) : Shin-ichi Sato It is certified that error appears in the above-identified patent and that said Letters Patent is hereby corrected as shown below:

COLUMN 25

Line 1, "Was" should read --is as--.

Line 21, "coloring-material" should read --coloring material--.

Line 26, "used" should read --used.--.

Line 53, "dispers ant" should read --dispersant--.

COLUMN 26

Line 41, "asbused" should read --as used--.

COLUMN 28

Line 65, "recording-medium" should read --recording medium--.

COLUMN 30

Line 1, "each." should read --each--.

Line 9, "the," should read --the--.

Signed and Sealed this

Twenty-seventh Day of May, 2008

JON W. DUDAS
*Director of the United States Patent and Trademark Office*